(12) United States Patent
Jain et al.

(10) Patent No.: US 9,544,709 B2
(45) Date of Patent: Jan. 10, 2017

(54) SMALL DATA TRANSMISSION TECHNIQUES IN A WIRELESS COMMUNICATION NETWORK

(75) Inventors: Puneet K. Jain, Hillsboro, OR (US); Meghashree Dattatri Kedalagudde, Cincinnati, OH (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 13/535,140

(22) Filed: Jun. 27, 2012

(65) Prior Publication Data

US 2013/0083726 A1 Apr. 4, 2013

Related U.S. Application Data

(60) Provisional application No. 61/542,726, filed on Oct. 3, 2011.

(51) Int. Cl.
*H04W 4/00* (2009.01)
*H04W 28/02* (2009.01)
*H04W 88/16* (2009.01)

(52) U.S. Cl.
CPC ......... *H04W 4/005* (2013.01); *H04W 28/0289* (2013.01); *H04W 88/16* (2013.01); *H04W 28/0215* (2013.01); *H04W 28/0247* (2013.01)

(58) Field of Classification Search
None
See application file for complete search history.

(56) References Cited

U.S. PATENT DOCUMENTS 8,125,892 B1  2/2012 Jokimies et al.
8,218,503 B2  7/2012 Terry et al.
(Continued)

FOREIGN PATENT DOCUMENTS

WO  WO2011099821 A2  8/2011
WO  WO2013022472 A1  2/2013

OTHER PUBLICATIONS

3GPP, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.1.0 (Jun. 2013), Jun. 24, 2013, Lte Advanced, 291 pages.
(Continued)

*Primary Examiner* — Anh-Vu Ly
*Assistant Examiner* — Roberta A Shand
(74) *Attorney, Agent, or Firm* — Schwabe, Williamson & Wyatt, P.C.

(57) ABSTRACT

Embodiments of the present disclosure describe techniques and configurations for transmitting small data payloads in a wireless communication network. An apparatus may include non-access stratum (NAS) circuitry configured to receive a trigger to send a data payload to a wireless communication network, the data payload having a size that is less than a preconfigured threshold, and generate a NAS message including the data payload and access stratum (AS) circuitry coupled with the NAS circuitry and configured to transmit the NAS message including the data payload to a node comprising a Mobility Management Entity (MME) or a Serving GPRS (General Packet Radio Service) Support Node (SGSN). Other embodiments may be described and/or claimed.

14 Claims, 10 Drawing Sheets

(56) References Cited

U.S. PATENT DOCUMENTS

| | | | |
|---|---|---|---|
| 8,244,244 B1 | 8/2012 | Hietalahti et al. | |
| 8,280,417 B2 | 10/2012 | Venkatachalam et al. | |
| 8,565,100 B2 | 10/2013 | Jokimies et al. | |
| 8,903,352 B2* | 12/2014 | Ou et al. | 455/404.1 |
| 2003/0112793 A1 | 6/2003 | Sengodan | |
| 2005/0026597 A1* | 2/2005 | Kim et al. | 455/412.1 |
| 2005/0119008 A1* | 6/2005 | Haumont | 455/456.1 |
| 2006/0029011 A1* | 2/2006 | Etemad et al. | 370/311 |
| 2007/0123195 A1* | 5/2007 | Lv et al. | 455/403 |
| 2007/0169107 A1 | 7/2007 | Huttunen | |
| 2011/0134841 A1 | 6/2011 | Shaheen | |
| 2011/0140846 A1 | 6/2011 | Blanz et al. | |
| 2011/0201343 A1 | 8/2011 | Pinheiro et al. | |
| 2011/0213871 A1 | 9/2011 | DiGirolamo et al. | |
| 2011/0238844 A1 | 9/2011 | Lu et al. | |
| 2012/0106391 A1 | 5/2012 | von Loon et al. | |
| 2012/0214520 A1 | 8/2012 | Bergqvist et al. | |
| 2012/0250668 A1* | 10/2012 | Sampath et al. | 370/338 |
| 2012/0252518 A1* | 10/2012 | Karampatsis et al. | 455/515 |
| 2012/0257571 A1* | 10/2012 | Liao | 370/328 |
| 2012/0289183 A1* | 11/2012 | Tiwari | 455/404.1 |
| 2013/0003576 A1* | 1/2013 | Segura et al. | 370/252 |
| 2013/0029639 A1* | 1/2013 | Lee et al. | 455/411 |
| 2013/0080597 A1* | 3/2013 | Liao | 709/219 |
| 2013/0100895 A1* | 4/2013 | Aghili et al. | 370/329 |
| 2013/0188515 A1 | 7/2013 | Pinheiro et al. | |
| 2013/0308564 A1* | 11/2013 | Jain et al. | 370/329 |
| 2014/0073367 A1* | 3/2014 | Chou | 455/466 |
| 2014/0219182 A1 | 8/2014 | Chandramouli et al. | |

OTHER PUBLICATIONS

International Search Report and Written Opinion mailed Mar. 20, 2013 from International Application No. PCT/US2012/063065.

International Preliminary Report on Patentability mailed Jan. 29, 2013 from International Application No. PCT/US2012/030763.

3GPP, "Technical Specification Group Services and System Aspects;System Improvements for Machine-Type Communications;(Release 11)," 3GPP TR 23.888 V1.5.0, Lte, Oct. 2011, 155 pages.

U.S. Appl. No. 13/535,140, filed Jun. 27, 2012.

3GPP, "Technical Specification Group Services and System Aspects; Service requirements for Machine-Type Communications (MTC); Stage 1 (Release 12)," 3GPP TS 22.368 V11.5.0, Lte Adavanced, Jun. 29, 2012, Section 7.2.14.3, 25 pages.

3GPP, "Technical Specification Group Core Network and Terminals; Technical realization of Cell Broadcast Service (CBS) (Release 11)," 3GPP TS 23.041 V11.3.0, Jun. 27, 2012, Section 9.4.1.2.2, 62 pages.

3GPP, "Technical Specification Group Services and System Aspects; System Improvements for Machine-Type Communications (Release 11)," 3GPP TR 23.888 V1.7.0, Lte, Aug. 17, 2012, 165 pages.

3GPP, "Technical Specification Group Radio Access Network; Broadcast/Multicast Control (BMC) (Release 10)," 3GPP TS 25.324 V10.0.0, Mar. 31, 2011, 26 pages.

3GPP, "Technical Specification Group Radio Access Network; UTRAN Iu-BC Interface: Service Area Broadcast Protocol (SABP) (Release 10)," 3GPP TS 25.419 V10.2.0, Sep. 27, 2011, 78 pages.

3GPP, "Technical Specification Group GSM/EDGE Radio Access Network; Base Station Controller—Base Transceiver Station (BSC-BTS) interface; Layer 3 specification (Release 10)," 3GPP TS 48.058 V10.0.0, GSM Global System for Mobile Communications, Mar. 23, 2011, 84 pages.

3GPP, "Technical Specification Group GSM/EDGE Radio Access Network; Short Message Service Cell Broadcast (SMSCB) support on the mobile radio interface (Release 10)," 3GPP TS 44.012 V10.0.0, GSM Global System for Mobile Communications, Mar. 23, 2011, 14 pages.

3GPP, "Technical Specification Group Services and System Aspects; Architecture Enhancements to facilitate communications with Packet Data Networks and Applications; (Release 11)," 3GPP TS 23.682 V0.2.0 , Lte, Feb. 2012, 23 pages.

International Application No. PCT/US2012/030763 filed Mar. 27, 2012.

International Application No. PCT/US2012/031042 filed Mar. 28, 2012.

U.S. Appl. No. 13/610,772, filed Sep. 11, 2012.

International Search Report mailed Jun. 28, 2012 in International Application No. PCT/US2012/030763.

International Search Report mailed Jun. 28, 2012 in International Application No. PCT/US2012/031042.

3GPP, "Technical Specification Group Services and System Aspects; System Improvements for Machine-Type Communications (Release 10)," 3rd Generation Partnership Project, 3GPP TR 23.888 V0.3.2, Mar. 2010, pp. 1-33.

3GPP, "Technical Specification Group Services and System Aspects; Service requirements for Machine-Type Communications (MTC); Stage 1 (Release 10)," 3rd Generation Partnership Project, 3GPP TR 22.368 V10.0.0, Mar. 2010, pp. 1-25.

Notification Concerning Transmittal of International Preliminary Report on Patentability mailed on May 15, 2014 from International Application No. PCT/US2012/063065.

Office Action issued Apr. 21, 2015 from U.S. Appl. No. 13/610,772.

* cited by examiner

SMALL DATA TRANSMISSION TECHNIQUES IN A WIRELESS COMMUNICATION NETWORK

CROSS REFERENCE TO RELATED APPLICATIONS

The present application claims priority to U.S. Provisional Patent Application No. 61/542,726, filed Oct. 3, 2011 entitled "ADVANCED WIRELESS COMMUNICATION SYSTEMS AND TECHNIQUES," the entire specification of which is hereby incorporated by reference in its entirety for all purposes.

FIELD

Embodiments of the present disclosure generally relate to the field of wireless communication systems, and more particularly, to techniques and configurations for transmitting small data payloads such as, for example, Machine Type Communication (MTC) data in a wireless communication network.

BACKGROUND

Mobile networks that facilitate transfer of information at broadband rates continue to be developed and deployed. Such networks may be colloquially referred to herein as broadband wireless access (BWA) networks. A variety of different device types may be used in broadband wireless technologies. Such devices may include, for example, personal computers, smartphone, laptops, netbooks, ultrabooks, tablets, handheld devices, and other consumer electronics such as music players, digital cameras, etc., that are configured to communicate over the wireless broadband networks.

Machine-to-Machine (M2M) may refer to technologies that allow wireless and wired systems to communicate with other devices without any human intervention. M2M may use a device such as, for example, a sensor or meter to collect information, which may be relayed through a network (e.g., wireless, wired, or hybrid) to an application that translates the information into meaningful data. The expansion of BWA networks across the world and accompanying increased speed/bandwidth and reduced power of wireless communication has facilitated growth of M2M communication. Although the amount of data sent by M2M devices is very small, a large number of these devices, in combination, may increase a load on a network. Current techniques for transmitting small data payloads such as machine type communication (MTC) data may be inefficient or incompatible with emerging BWA networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
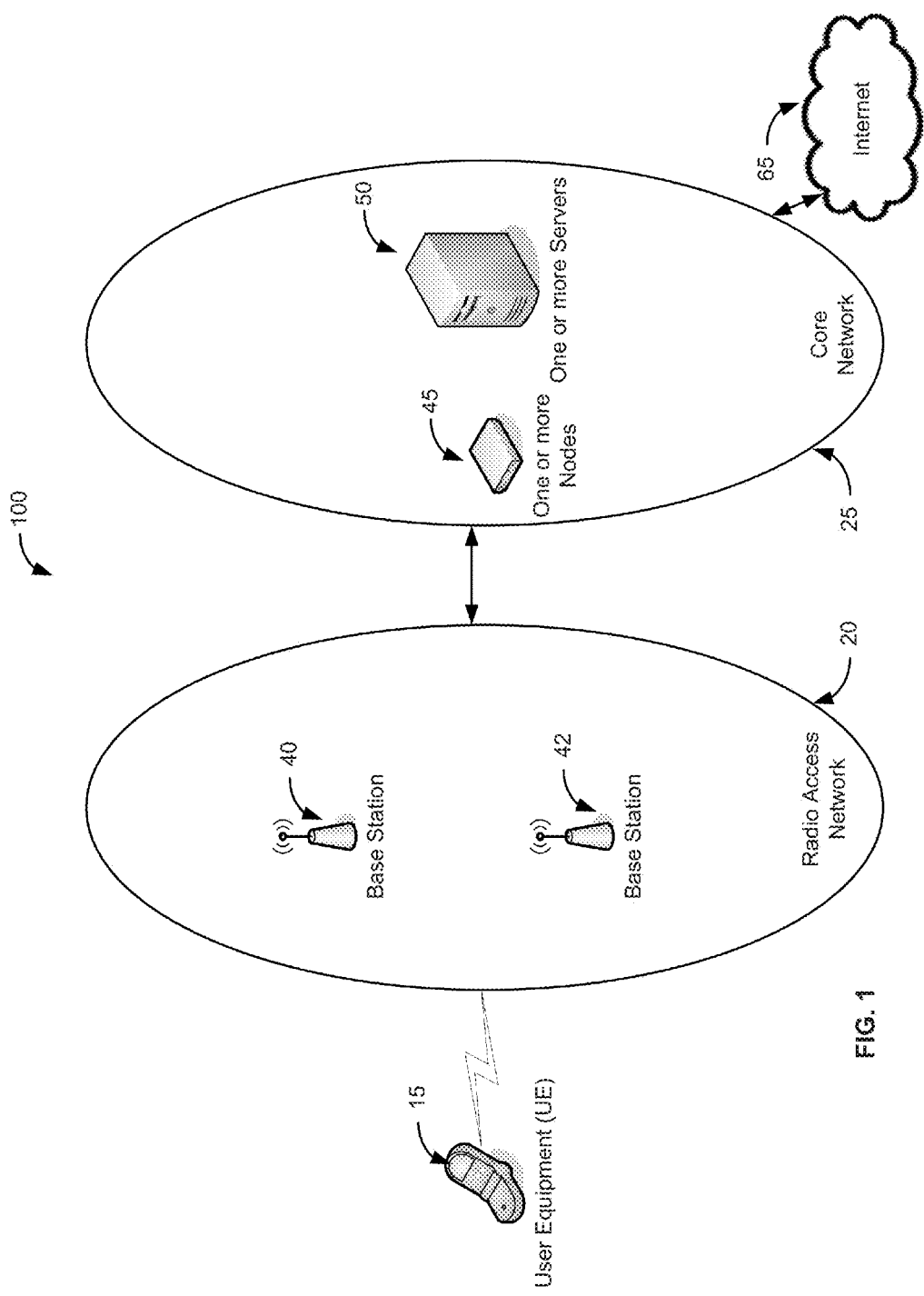
FIG. 1 schematically illustrates an example broadband wireless access (BWA) network in accordance with some embodiments.

Embodiments of the present disclosure provide techniques and configurations for transmitting small data payloads such as, for example, Machine Type Communication (MTC) data in a wireless communication network. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to broadband wireless access (BWA) networks including networks operating in conformance with one or more protocols specified by the 3$^{rd}$ Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

FIG. 1 schematically illustrates an example broadband wireless access (BWA) network 100 in accordance with some embodiments. The BWA network 100 may include one or more radio access networks (hereinafter "RAN 20") and a core network 25.

User Equipment (UE) 15 may access the core network 25 via a radio link ("link") with a base station (BS) such as, for example, one of base stations 40, 42, etc., in the RAN 20. The UE 15 may, for example, be a subscriber station that is configured to communicate with the base stations 40, 42 in conformance with one or more protocols. The following description is provided for an example BWA network 100 that conforms with 3GPP for ease of discussion, however, subject matter of the present disclosure is not limited in this regard and the described embodiments may apply to other wireless communication networks that benefit from the principles described herein. In some embodiments, the base stations 40, 42 may include enhanced Node B (eNB) stations and a UE 15 that is configured to communicate using a multiple-input and multiple-output (MIMO) communication scheme. One or more antennas of the UE 15 may be used to concurrently utilize radio resources of multiple respective component carriers (e.g., which may correspond with antennas of eNB stations 40, 42) of the BWA network 100. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a cellular phone, in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. The base stations 40, 42 may include one or more antennas, one or more radio modules to modulate and/or demodulate signals transmitted or received on an air interface, and one or more digital modules to process signals transmitted and received on the air interface.

In some embodiments, communication with the UE 15 via RAN 20 may be facilitated via one or more nodes 45. The one or more nodes 45 may serve as an interface between the core network 25 and the RAN 20. According to various embodiments, the one or more nodes 45 may include a Mobile Management Entity (MME) (e.g., SGSN/MME 58 of FIG. 2) that is configured to manage signaling exchanges (e.g., authentication of the UE 15) between the base stations 40, 42 and the core network 25 (e.g., one or more servers 50), a Packet Data Network Gateway (PGW) (e.g., GGSN/PGW 51 of FIG. 2) to provide a gateway router to the Internet 65, and/or a Serving Gateway (SGW) to manage user data tunnels or paths between the base stations 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the BWA network 100. For example, the core network 25 may include one or more servers 50 that may be communicatively coupled to the base stations 40, 42. In an embodiment, the one or more servers 50 may include a Home Subscriber Server (HSS) (e.g., HLR/HSS 56 of FIG. 2), which may be used to manage user parameters such as a user's International Mobile Subscriber Identity (IMSI), authentication information, and the like. The core network 25 may include other servers, interfaces, and modules some of which are further described in connection with FIG. 2. The one or more servers 50 may include over-the-air (OTA) servers in some embodiments. In some embodiments, logic associated with different functionalities of the one or more servers 50 may be combined to reduce a number of servers, including, for example, being combined in a single machine or module.

According to various embodiments, the BWA network 100 is an Internet Protocol (IP) based network. For example, the core network 25 may be an IP based network. Interfaces between network nodes (e.g., the one or more nodes 45) may be based on IP, including a backhaul connection to the base stations 40, 42. In some embodiments, the BWA network 100 includes a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. In some embodiments, the RAN 20 may include GSM EDGE Radio Access Network (GERAN) where EDGE stands for Enhanced Data for GSM Evolution, Universal Terrestrial Radio Access Network (UTRAN), or Evolved UTRAN (E-UTRAN). The BWA network 100 may operate in accordance other network technologies in other embodiments.

Figure 2:
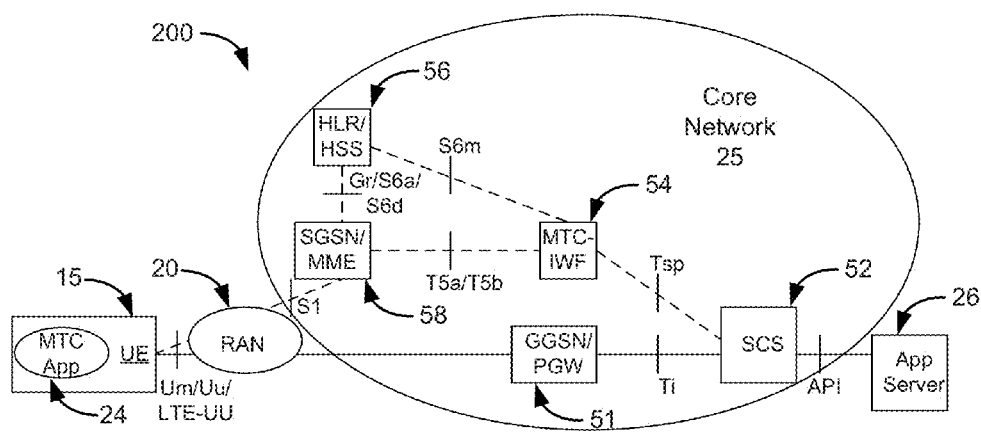
FIG. 2 schematically illustrates system architecture for transmitting a small data payload, in accordance with some embodiments.

FIG. 2 schematically illustrates system architecture 200 for transmitting a small data payload, in accordance with some embodiments. The system architecture 200 may be configured to efficiently perform small data transmissions intended for use with Machine-to-Machine (M2M) communication such as, for example, MTC communication, in some embodiments. For example, user equipment (UE) 15 may include or be communicatively coupled with smart meters or sensors to collect small amounts of information for transmission (e.g., health monitoring devices, vending machines, and the like configured to collect information about temperature, inventory, etc.). In some embodiments, an Application server 26 may be configured to send or trigger sending of a small data payload (e.g., to request MTC information such as sensor or meter measurement, inventory level, etc.). The data payload (e.g., MTC data payload) may be smaller than a preconfigured threshold to define a small data payload in some embodiments. The preconfigured threshold may be set by subscription or network operator policy in some embodiments.

According to various embodiments, the small data payload may be sent by the UE 15 to a Services Capability Server (SCS) 52 or Application server 26 via RAN 20 and core network 25 or the small data payload may be sent by the Application server 26 or SCS 52 to the UE 15 via the core network 25 and the RAN 20. For example, an Application server 26 may be configured (e.g., by an MTC user) to send or trigger sending of a small data payload to user equipment (UE) 15. The Application server 26 may be communicatively coupled with the core network 25 using, for example, an Internet connection (e.g., Internet 65 of FIG. 1). In another example, an MTC application 24 that is communicatively or operatively coupled with the UE 15 may be configured to send or trigger the sending of a small data payload from the UE 15 to the SCS 52 and/or Application server 26. In some embodiments, the UE 15 is an MTC device configured to send or receive small data payloads and/or otherwise communicate with the MTC application 24. In some embodiments, the UE 15 may include the MTC application 24.

The system architecture 200 includes an SCS 52, which is configured to connect to the core network 25 to communicate with UEs (e.g., UE 15) that are configured for small data (e.g., MTC) communication. The SCS 52 may be further configured to communicate with an Interworking Function (IWF) such as MTC-IWF 54 to trigger a transmission of a small data payload. In some embodiments, the SCS 52 may be an MTC server.

The MTC-IWF 54 may terminate a Tsp reference point or interface (hereinafter "reference point") between the SCS 52 and the MTC-IWF 54. The MTC-IWF 54 may be configured to hide internal public land mobile network (PLMN) topology and relay or translate signaling protocols used over the Tsp reference point to invoke specific functionality in the PLMN. In some embodiments, the MTC-IWF 54 may authenticate the SCS 52 before communication is established with the core network 25 and/or control plane requests from the SCS 52 are authorized. According to various embodiments, the dashed lines between modules (e.g., 54, 58) represent a control plane and the solid lines between modules represent a user plane. While a particular plane may be shown between modules, other embodiments may include additional or alternative planes.

In one embodiment, the MTC-IWF 54 may terminate a T5a/T5b reference point between a module including a Mobility Management Entity (MME) and/or a Serving GPRS (General Packet Radio Service) Support Node (SGSN) such as, for example, SGSN/MME 58. In some embodiments, the T5a reference point may terminate on the SGSN of the SGSN/MME 58 and the T5b reference point may terminate on the MME of the SGSN/MME 58. In another embodiment, the MTC-IWF 54 may terminate an S6m reference point between a module including a Home Location Register (HLR) and/or Home Subscriber Server (HSS) such as, for example, HLR/HSS 56.

According to various embodiments, the T5a/T5b reference point may be used to send control packet information to a network (e.g., a 3GPP PLMN) based on an indication from the SCS 52. The S6m reference point may be used to derive routing information for a downlink small data payload by obtaining a network identifier (e.g., 3GPP internal device identifier such as IMSI or Mobile Station International Subscriber Directory Number (MSISDN)) from an MTC device identifier or MTC application identifier.

The system architecture 200 may further include Gr/S6a/S6d reference points between the HLR/HSS 56 and the SGSN/MME 58, reference point Ti between the SCS 52 and the GGSN/PGW 51, reference point Application Programming Interface (API) between the Application server 26 and the SCS 52, reference point 51 between the SGSN/MME 58 and the RAN 20, and reference points Um/Uu/LTE-UU between the RAN 20 and the UE 15. The reference points are not limited to the example names provided and may be referred to by other names in other embodiments. The system architecture 200 may include other reference points in other embodiments.

The system architecture 200 may support transmission of small data payloads with little network impact such as signaling overhead, network resources, or delay for reallocation. In some embodiments, the UE 15 may be attached (e.g., by an established Radio Resource Control (RRC) connection) or detached from the RAN 20 before transmission of the small data payload (e.g., when the small data payload transmission is triggered). The UE 15 may be in connected mode or idle mode when the small data payload transmission is triggered in some embodiments. According to various embodiments, the system architecture 200 may be configured to send the small data payload over the T5a/T5b or S6m reference points.

Figure 3A:
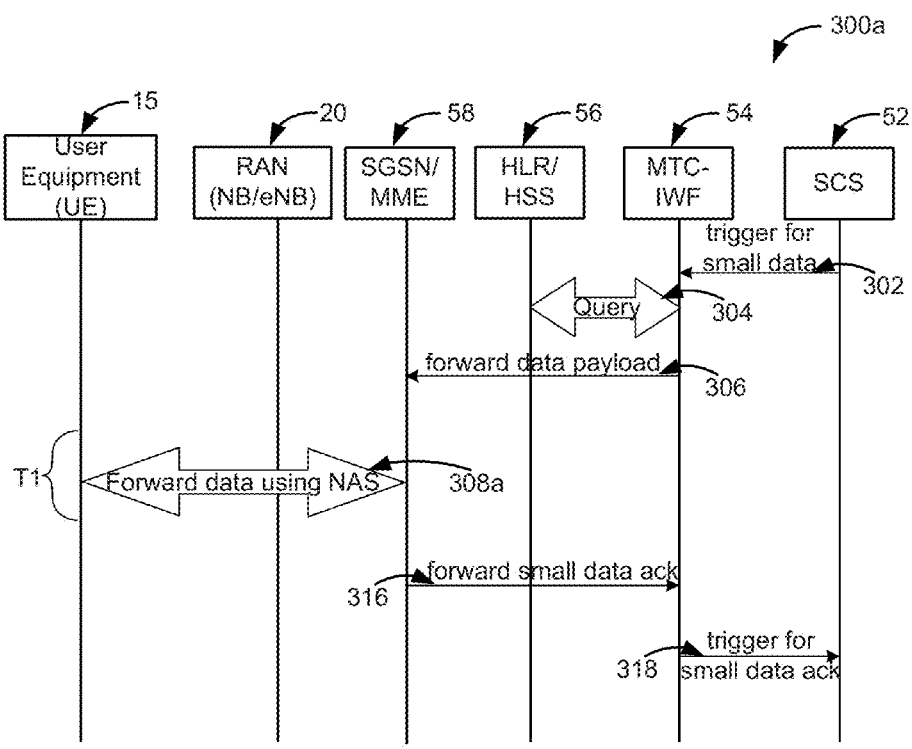
FIGS. 3a-3d schematically illustrate example schemes for transmitting a small data payload, in accordance with some embodiments.

FIG. 3a schematically illustrates an example scheme 300a for transmitting a small data payload, in accordance with some embodiments. The scheme 300a depicts a method for sending a small data payload (e.g., downlink) to the UE 15 over the T5a/T5b reference point according to a first technique, T1.

Referring to FIGS. 2 and 3a, at 302, the SCS 52 may send a message to the MTC-IWF 54 to trigger transmission of a small data payload. The SCS 52 may include an MTC device identification (ID) and/or an MTC application (e.g., MTC application 24) ID in the message to indicate a target UE (e.g., UE 15) to receive the small data payload. The SCS 52 may further include in the message, or otherwise send, the small data payload to the MTC-IWF 54 in some embodiments. In other embodiments, an Application server 26 may directly send the small data payload to the MTC-IWF 54. In some embodiments, a secure connection may be established between the MTC-IWF 54 and the SCS 52 for transmissions at 302.

At 304, in response to receiving the trigger at 302, the MTC-IWF 54 may Query the HLR/HSS 56 to obtain routing information to deliver the small data payload to the UE 15 over the T5a/T5b reference point. In some embodiments, the MTC-IWF 54 may send the MTC device ID to the HLR/HSS 56, which may have the MTC Device ID as part of an MTC subscription. The HLR/HSS 56 may map the MTC Device ID to an IMSI of the UE 15 and send the IMSI along with an address for the SGSN/MME 58 back to the MTC-IWF 54. A trust relation may be established between the MTC-IWF 54 and the HLR/HSS 56 in some embodiments (e.g., when the MTC-IWF 54 is outside of a domain of an operator of the core network). In response to receiving the query at 304 from the MTC-IWF 54, the HLR/HSS 56 may send to the MTC-IWF 54 IMSI serving node identities and/or other information such as operator policy, authorization information, failure indication with cause value, and the like.

At 306, the MTC-IWF 54 may send the small data payload and a request (e.g., Forward Small Data request) to forward the small data payload, to the SGSN/MME 58 over the T5a/T5b reference point. The MTC-IWF 54 may use the IMSI to send the request and the small data payload to the SGSN/MME 58.

In accordance with the first technique T1 of sending the small data payload from the SGSN/MME 58 to the UE 15, the SGSN/MME 58 may determine that the UE 15 is in a connected state and, at 308a, forward the small data payload to the UE 15 using uplink/downlink (UL/DL) Non-Access Stratum (NAS) signaling. For example, the SGSN/MME 58 may determine that the UE 15 is in a connected state by determining that a context (e.g., locally stored) already exists to indicate a location for the UE 15. The SGSN/MME 58 may send the small data payload to the UE 15 using, for example, a downlink Non-Access Stratum (NAS) transport message. An acknowledgement that the small data payload has been sent to the UE 15 may be received by the SGSN/MME 58 during communications at 308a.

At 316, the SGSN/MME 58 may forward to the MTC-IWF 54 the acknowledgement that the small data payload has been sent to the UE 15. At 318, the MTC-IWF 54 may send a trigger to the SCS 52 to send an acknowledgement that the small data payload has been delivered to the UE 15. The SCS 52 may, for example, send the acknowledgement to the Application server 26 in response to the trigger.

Figure 3B:
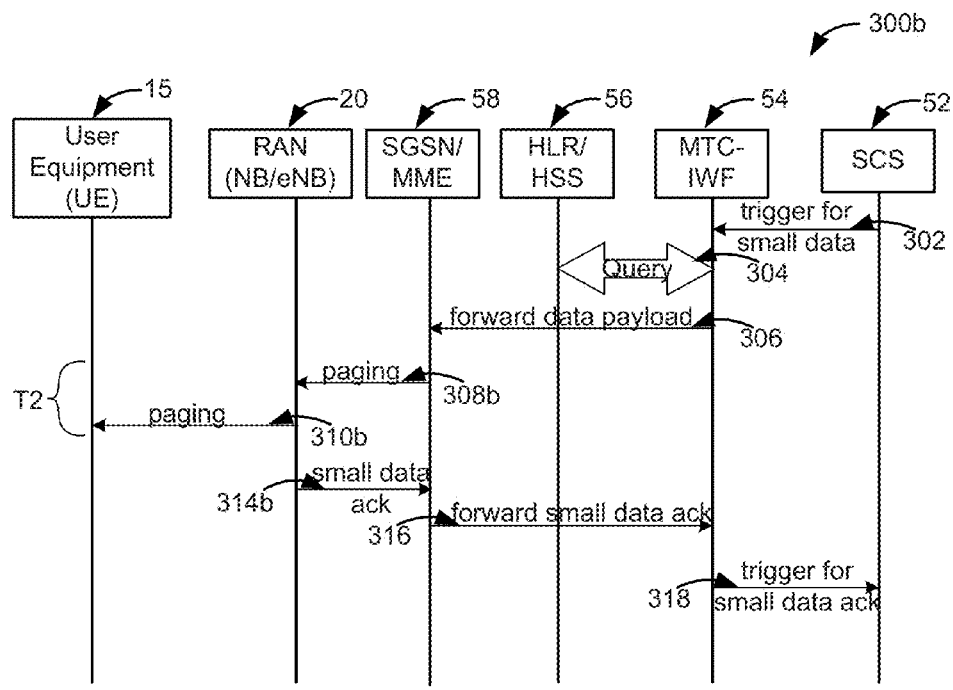

FIG. 3b schematically illustrates an example scheme 300b for transmitting a small data payload, in accordance with some embodiments. The scheme 300b depicts a method for sending a small data payload (e.g., downlink) to the UE 15 over the T5a/T5b reference point according to a second technique, T2. Actions from 302 to 306 and from 316 to 318 of scheme 300b may comport with embodiments described for same numbered actions of scheme 300a.

In accordance with the second technique T2 of sending the small data payload from the SGSN/MME 58 to the UE 15, the SGSN/MME 58 may determine that the UE 15 is in an idle state and, at 308b, may send the small data payload to the RAN 20 (e.g., base station 40 or 42 of FIG. 1) in a paging message. The RAN 20 may send, at 310b, the paging message including the small data payload to the UE 15. For example, the small data payload may be included in a paging message that is broadcasted in a tracking area of a target UE 15 that is in idle mode. The SGSN/MME 58 may be configured to send the paging message including the small data payload over a control plane in some embodiments. In some embodiments, the RAN 20 may inform the SGSN/MME 58 that the small data payload was successfully delivered by sending, at 314b, a small data acknowledgement to the SGSN/MME 58, which may be forwarded to the MTC-IWF 54 at 316.

Figure 3C:
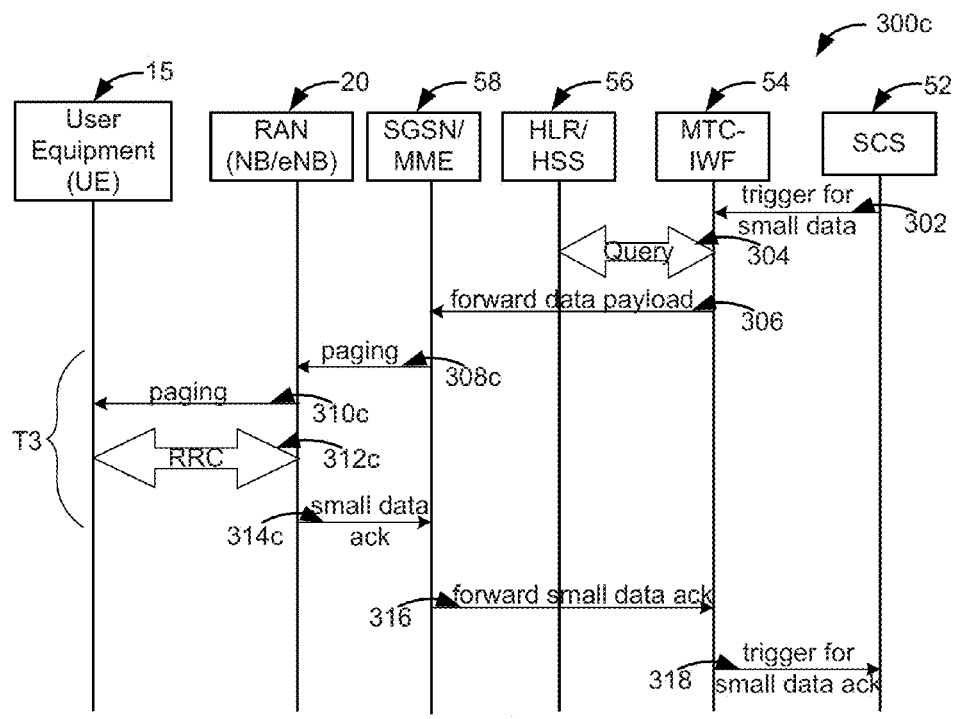

FIG. 3c schematically illustrates an example scheme 300c for transmitting a small data payload, in accordance with some embodiments. The scheme 300c depicts a method for sending a small data payload (e.g., downlink) to the UE 15 over the T5a/T5b reference point according to a third technique, T3. Actions from 302 to 306 and from 316 to 318 of scheme 300c may comport with embodiments described for same numbered actions of scheme 300a.

In accordance with the third technique T3 of sending the small data payload from the SGSN/MME 58 to the UE 15, the SGSN/MME 58 may determine that the UE 15 is in an idle state and, at 308c, may send a paging message including the small data payload to the RAN 20 (e.g., base station 40 or 42 of FIG. 1). The paging message may further include an optional small data indicator to indicate that the small data payload is at the RAN 20 (e.g., at base station 40 or 42 of FIG. 1). In some embodiments, the SGSN/MME 58 may send the small data payload over the S1 reference point to RAN 20.

In some embodiments, the RAN 20 may retrieve and/or store the small data payload from the paging message and send, at 310c, a paging message to the UE 15 without the small data payload. The RAN 20 may include the small data indicator with the paging message. In some embodiments where the small data payload is at the RAN 20 prior to the UE 15 being attached to the RAN 20 (e.g., by RRC connection), the UE 15 may receive the paging message sent at 310c with the small data indicator indicating that the small data payload is at the RAN 20.

At 312c, the UE 15 may begin an attachment process to the RAN 20 by, e.g., establishment of an RRC connection. For example, the establishment of the RRC connection may be requested by the UE 15 in an RRC connection request message to the RAN 20 in response to the paging message at 310c. The RAN 20 may deliver the small data payload to the UE 15 via signals associated with the RRC connection setup procedure. When the UE 15 receives the small data payload, the UE 15 may terminate the RRC connection setup procedure and may return to an idle mode if no other data is to be sent or received by the UE 15. In some embodiments, the RAN 20 may inform the SGSN/MME 58 that the small data payload was successfully delivered by sending, at 314c, a small data acknowledgement to the SGSN/MME 58.

Figure 3D:
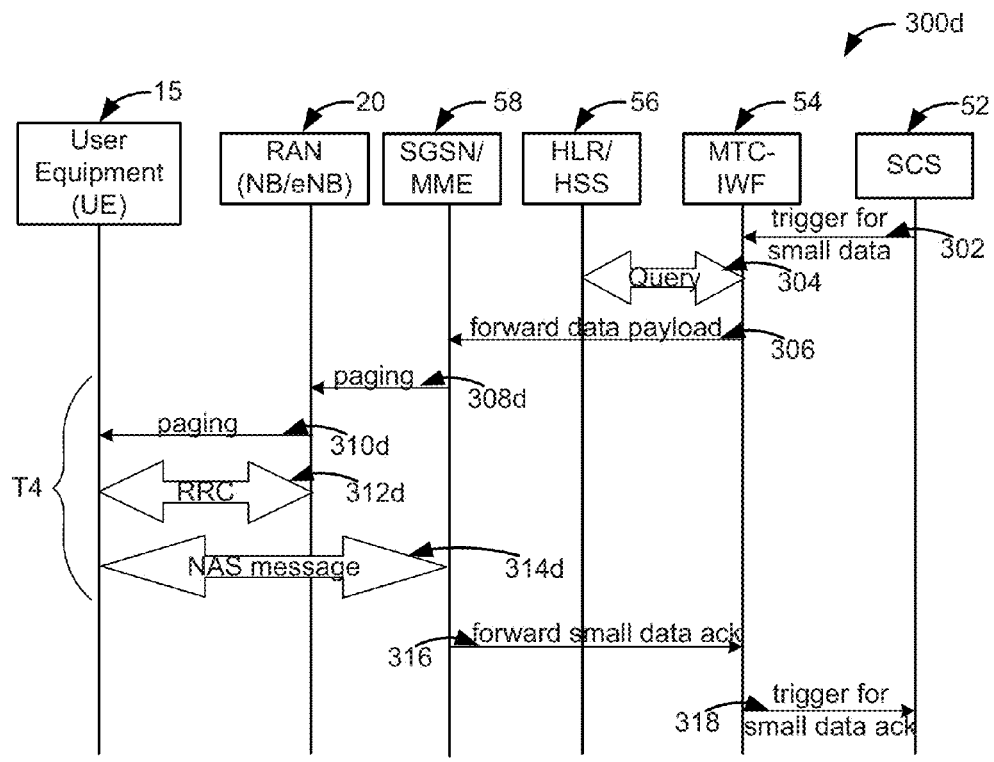

FIG. 3d schematically illustrates an example scheme 300d for transmitting a small data payload, in accordance with some embodiments. The scheme 300d depicts a method for sending a small data payload (e.g., downlink) to the UE 15 over the T5a/T5b reference point according to a fourth technique, T4. Actions from 302 to 306 and from 316 to 318 of scheme 300d may comport with embodiments described for same numbered actions of scheme 300a.

In accordance with the fourth technique T4 of sending the small data payload from the SGSN/MME 58 to the UE 15, the SGSN/MME 58 may determine that the UE 15 is in an idle state and, at 308d, may send a paging message that may include a small data indicator that indicates a presence of the small data payload at the SGSN/MME 58 that needs to be delivered or forwarded to the UE 15. At 310*d*, the RAN 20 may send the paging message, which may include the small data indicator to the UE 15 to indicate that the small data payload targeted for the UE 15 is at the SGSN/MME 58. In some embodiments where the small data payload is at the SGSN/MME 58 prior to the UE 15 being attached to the RAN 20 (e.g., by RRC connection), the UE 15 may receive the paging message sent at 310*d* with the small data indicator indicating that the small data payload is at the SGSN/MME 58. In response to the paging message at 310*d*, the UE 15, at 312*d*, may begin an attachment process to the RAN 20 by, e.g., establishment of an RRC connection and, at 314*d*, begin an attachment process with the SGSN/MME 58 by sending a Non-Access Stratum (NAS) message such as an attach/service request message to the RAN 20. In some embodiments, the NAS message may be a routing area update request message or a tracking area update request message. In some embodiments, the NAS message may be an UL or DL NAS transport message or generic NAS transport message. The RAN 20 may forward the NAS message to the SGSN/MME 58. During the attachment process at 314*d*, the SGSN/MME 58 may send the small data payload to the UE 15 using Non-Access Stratum (NAS) signaling, e.g., attach response, service request response, DL NAS transport message, etc.

The content of the NAS message sent by the UE 15 to begin the attachment process at 314*d* may depend on the content of the paging message received by the UE 15 at 310*d*. For example, in a case where the paging message at 310*d* contains only the small data indicator indicating that the small data payload is at the SGSN/MME 58, the UE 15 may include an information element including a Key Set Identifier (KSI), which may be associated with cipher and integrity keys, and a sequence number, which may be a counter value for the UE 15, in the NAS message. The MME of the SGSN/MME 58 may use the KSI, the sequence number and a Temporary Mobile Subscriber Identity (TMSI) value such as an S-TMSI, where the S refers to System Architecture Evolution (SAE), to encrypt the small data payload for delivery to the UE 15. When the UE 15 receives the small data payload, the UE 15 may terminate the attachment process and may be configured to return to an idle mode if no other data is to be sent or received by the UE 15.

In some embodiments where the paging message sent at 310*d* includes the small data payload (e.g., at 310*b* of FIG. 3*b*), the UE 15 may or may not be required by network operator policy to send a response message to the small data payload from the SCS 52. In a case where network operator policy does not require sending of any response, the UE 15 may be configured to include an information element including an acknowledgement such as an MTC data acknowledgement in the NAS message that is sent to begin the attachment process at 314*d*. In a case where network operator policy requires sending of a response, the UE 15 may include an information element including the KSI and sequence number and an encrypted response payload as a NAS Packet Data Unit (PDU) in a NAS container in the NAS message that is sent to begin the attachment process at 314*d*. If the UE 15 has multiple response messages or more data to fit in the NAS container at 314*d*, the UE 15 may indicate in the NAS container that more data is to follow. After the attach/service request message has been sent by the UE 15 to begin the attachment process at 314*d*, the UE 15 may include the additional data in a NAS PDU in an uplink information transfer message to the SGSN/MME 58. In some embodiments, if the UE 15 has an uplink small data payload to send to the SCS 52, the UE 15 may activate Packet Data Protocol (PDP) Context and/or PDP bearers and send uplink data on a user plane (e.g., via GGSN/PGW 51 of FIG. 2).

In embodiments where the NAS message (e.g., of attachment process at 314*d*) sent by the UE 15 to the SGSN/MME 58 includes only the KSI and the sequence number (e.g., a case where the paging message at 310*d* contains only the small data indicator indicating that the small data payload is at the SGSN/MME 58), the SGSN/MME 58 may send the small data payload in an encrypted information element in a NAS message such as, for example, an encrypted information element in a NAS PDU in an S1 downlink NAS transport message to the UE 15. The UE 15 may send a response message or an acknowledgement in response to the NAS message with the small data payload. The acknowledgement may include, for example, an acknowledgement in an encrypted information element in a NAS PDU in an uplink information transfer message. The UE 15 may further include in the response message or acknowledgement, an information element in the uplink information transfer message to request the release of the RRC connection at 312*d* if the UE 15 does not have further data to send.

In some embodiments, if the NAS message (e.g., attach/service request message) that is sent to begin the attachment process at 314*d* includes the information element including an acknowledgement such as an MTC data acknowledgement (e.g., a case where network operator policy does not require sending of a response to reception by the UE 15 of the small data payload), the SGSN/MME 58 may send or forward the data acknowledgement to the MTC-IWF 54 at 316. If the NAS message (e.g., attach/service request message) that is sent to begin the attachment process at 314*d* includes an information element including the KSI and sequence number and an encrypted response payload as a NAS Packet Data Unit (PDU) in a NAS container (e.g., a case where network operator policy requires sending of a response to indicate reception by the UE 15 of the small data payload), the SGSN/MME 58 may decrypt the NAS PDU and forward, at 316, the response payload to the MTC-IWF 54. The SGSN/MME 58 may also send an acknowledgement in an encrypted information element in a NAS PDU in an S1 downlink NAS transport message to the UE 15.

In some embodiments, the S1 downlink NAS transport message may include an information element that allows the MME of the SGSN/MME 58 to request the base station of the RAN 20 to release the RRC connection at 312*d*. The MME may not use this indication if the UE 15 previously indicated that multiple response messages are to be transferred.

Figure 4:
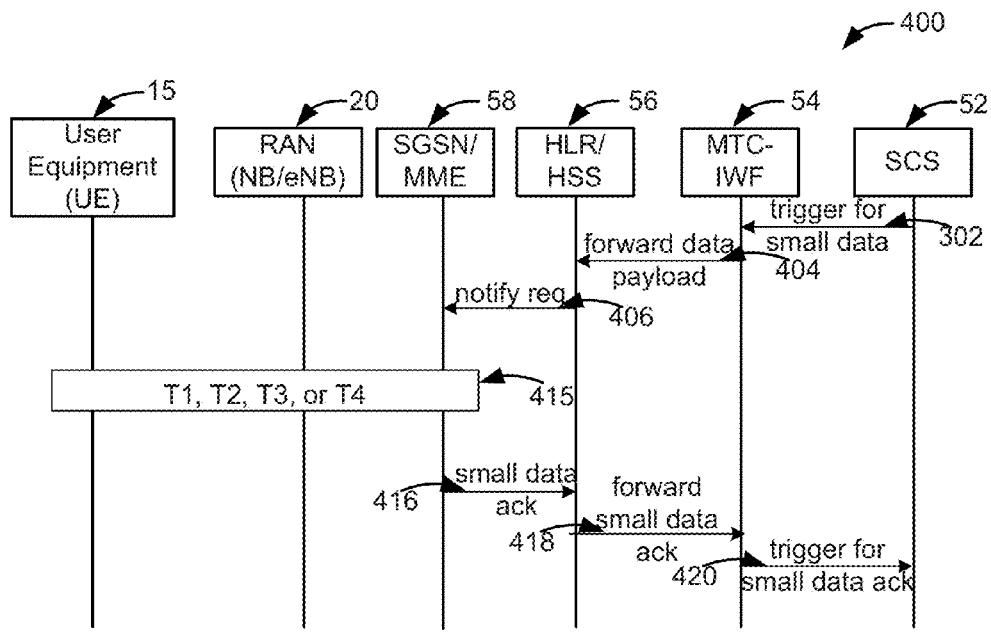
FIG. 4 schematically illustrates another example scheme for transmitting a small data payload, in accordance with some embodiments.

FIG. 4 schematically illustrates another example scheme 400 for transmitting a small data payload, in accordance with some embodiments. The scheme 400 depicts a method for sending a small data payload (e.g., downlink) to the UE 15 over the S6*m* reference point. The scheme 400 may comport with embodiments described in connection with schemes 300*a*-*d* of FIGS. 3*a*-3*d* except where otherwise indicated. For example, the small data payload may be sent, at 415, from the SGSN/MME 58 to the UE 15 according to the first, second, third, or fourth techniques (e.g., T1, T2, T3, or T4) as described in connection with FIGS. 3*a*-3*d*.

Referring to FIGS. 2 and 4, at 302, the SCS 52 may send a message to the MTC-IWF 54 to trigger transmission of a small data payload. The action at 302 may comport with embodiments described in connection with 302 of FIG. 3*a*.

At 404, the MTC-IWF 54 may send the small data payload and a request (e.g., Forward Small Data request) to forward the small data payload, to the HLR/HSS 56 over the S6m reference point. The MTC-IWF 54 may use MTC device identification (ID) and/or an MTC application ID (ID of MTC Application 24) in the message to indicate a target UE (e.g., UE 15) to the HLR/HSS 56. A trust relation may be established between the MTC-IWF 54 and the HLR/HSS 56 in some embodiments (e.g., when the MTC-IWF 54 is outside of a domain of an operator of the core network).

The HLR/HSS 56 may have the MTC device ID as part of an MTC subscription. The HLR/HSS 56 may be configured to map the MTC device ID to an IMSI of the UE 15 and derive the target SGSN/MME 58. At 406, the HLR/HSS 56 may send the small data payload to the SGSN/MME 58 (e.g., over the reference points Gr/S6a/S6d of FIG. 2). The small data payload may be sent, for example, in a notify request message.

At 415, the SGSN/MME 58 may send the small data payload to the UE 15. At 416, the SGSN/MME 58 may send or forward a response or acknowledgement as described in connection with FIGS. 3a-3d to the HLR/HSS 56. At 418, the HLR/HSS 56 may forward the response or acknowledgement to the MTC-IWF 54 over the S6m reference point.

At 420, the MTC-IWF 54 may send a trigger to the SCS 52 to send an acknowledgement that the small data payload has been delivered to the UE 15. The SCS 52 may, for example, send the acknowledgement to the Application server 26. According to various embodiments, techniques described in connection with FIGS. 3a-3d and FIG. 4 may be combined. For example, the small data payload may be sent over the T5a/T5b reference point and the acknowledgement may be received over the S6m reference point or vice versa.

Figure 5:
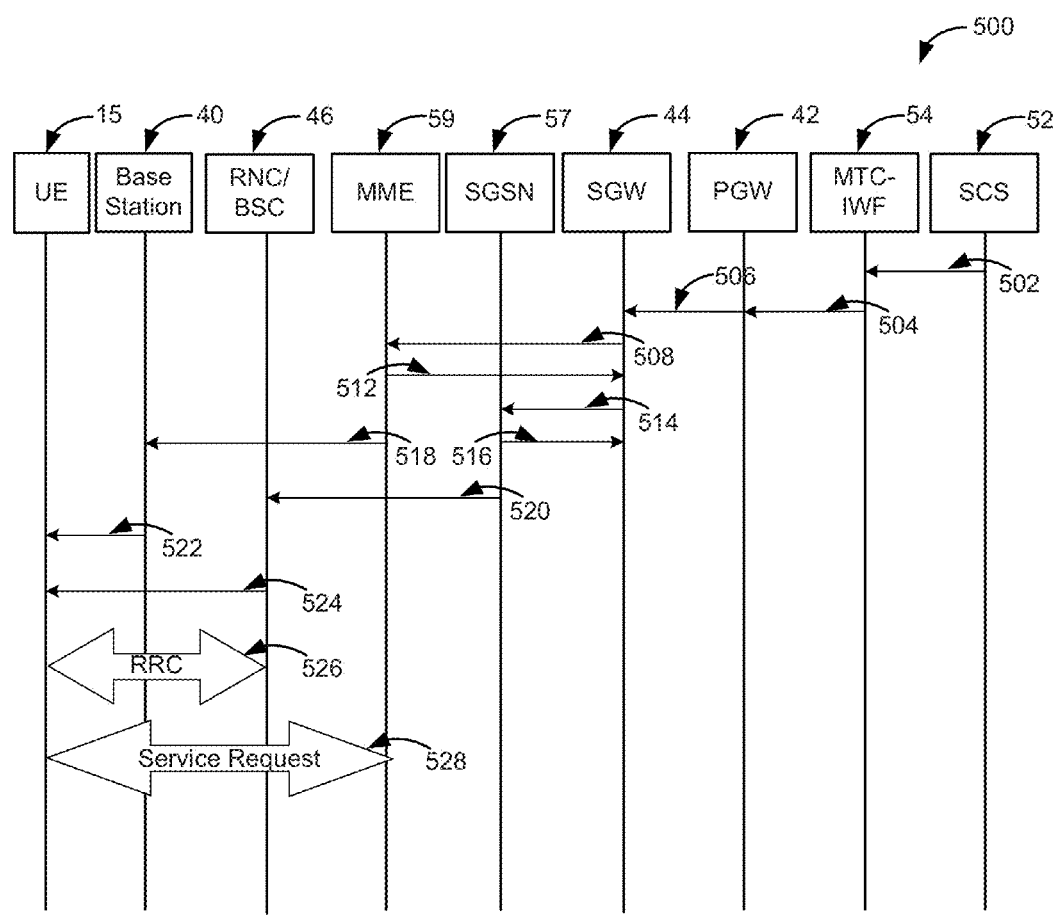
FIG. 5 schematically illustrates yet another example scheme for transmitting a small data payload, in accordance with some embodiments.

FIG. 5 schematically illustrates yet another example scheme 500 for transmitting a small data payload, in accordance with some embodiments. The scheme 500 depicts a method for sending a small data payload (e.g., downlink) to the UE 15. The scheme 500 is described in connection with a Long Term Evolution/Evolved Packet Core (LTE/EPC) system, however, similar concepts may apply to other systems.

The SCS 52 may receive a trigger to send a small data payload as described in connection with scheme 300a of FIG. 3a. At 502, in response to receiving the trigger, the SCS 52 may send the small data payload, at 504, to PGW 42 (e.g., PGW of the GGSN/PGW 51 of FIG. 2). At 506, the PGW 42 may send the small data payload to a serving gateway (SGW) over an established default bearer.

At 508, the SGW 44 may send a downlink data notification message to the MME 59 and/or at 514, the SGW 44 may send a downlink notification message to the SGSN 57. At 512 the MME 59 may respond with a downlink data notification acknowledgement message and/or at 516, the SGSN 57 may respond with a downlink data notification acknowledgement message.

At 518, the MME may send a paging message to the base station if the UE 15 is registered in the MME. At 520, the SGSN 57 may send a paging message to a Radio Network Controller/Base Station Controller (RNC/BSC) 46 if the UE is registered in the SGSN 57. At 522, the base station 40 may send a paging message to the UE 15 and/or at 524, the RNC/BSC 46 may send a paging message to the UE 15. The paging messages may indicate to the UE 15 that a downlink small data payload is to be sent to the UE 15.

At 526, in response to the paging message(s) the UE 15 may perform an attachment process to establish an RRC connection with the base station 40 and/or RNC/BSC 46 (e.g., RAN 20 of FIG. 3a). At 528, the UE 15 may perform an attachment process (e.g., a service request procedure) to establish a connection with the MME 59, SGSN 57 and/or SGW 44. The SGW 44 may transmit the small data payload to the UE 15 via Radio Access Technology (RAT), which may be the RAT used to perform the attachment process at 528. According to various embodiments, the RRC connection at 526 may comport with embodiments described in connection with action 312c of FIG. 3c and the attachment process at 528 may comport with embodiments described in connection with action 314d of FIG. 3d.

Figure 6:
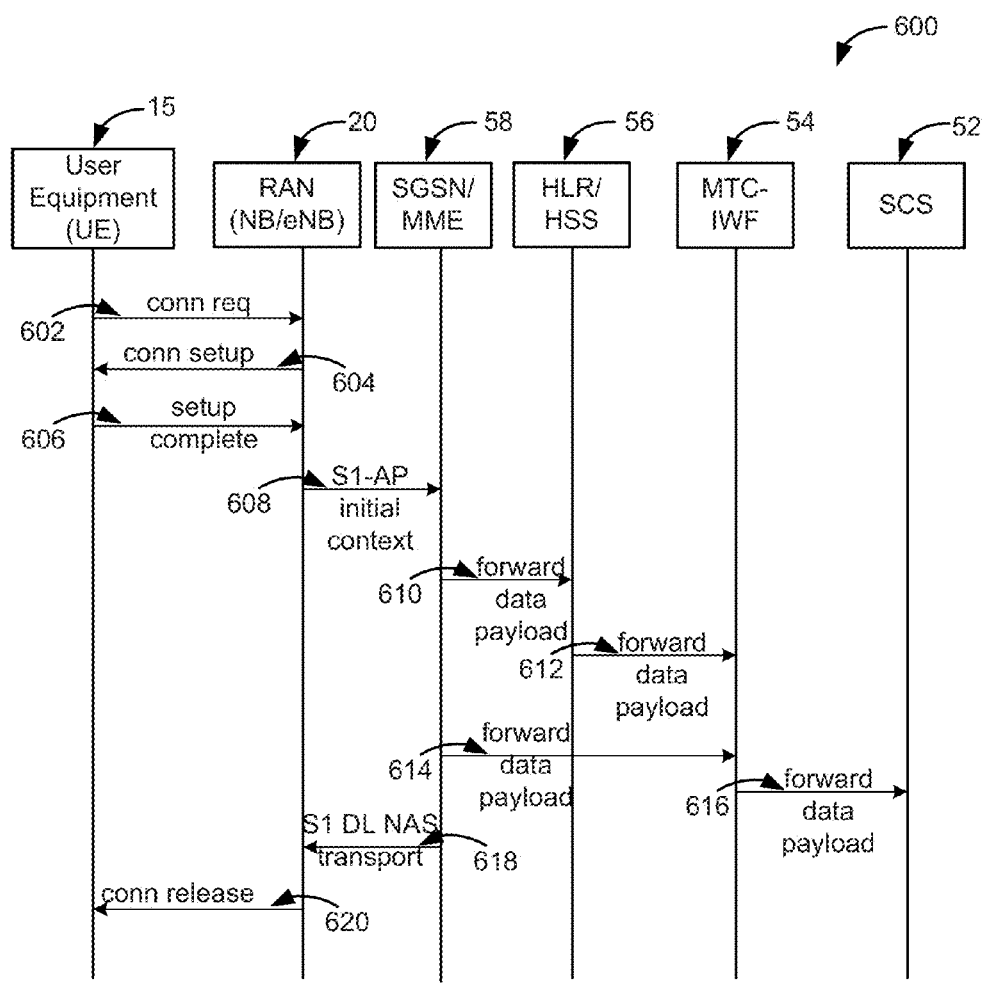
FIG. 6 schematically illustrates still yet another example scheme for transmitting a small data payload, in accordance with some embodiments.

FIG. 6 schematically illustrates still yet another example scheme 600 for transmitting a small data payload, in accordance with some embodiments. The scheme 600 depicts a method for sending a small data payload (e.g., uplink) from the UE 15 to the SCS 52 over the T5a/T5b or S6m reference points.

Referring to FIGS. 2 and 6, the UE 15 may be triggered by the MTC application 24 to send a small data payload to the SCS 52. At 602, in response to the trigger, the UE 15 may send a connection request message to RAN 20. The UE 15 may include a NAS module and an Access Stratum (AS) module. In some embodiments, the NAS module may be configured to request the AS module to establish, for example, an RRC connection including a TMSI (e.g., S-TMSI) of the UE 15 in the connection request message resulting in the action at 602. The UE 15 may include a value that indicates to a base station of RAN 20 that a short-lived signaling procedure is in progress. For example, the UE 15 may set a cause value in the connection request message to "mo-Signaling." Such action may reduce a likelihood that the MME of SGSN/MME 58 will download a security context to the base station. Without the security context, handover may not be performed. Radio resources can be saved if the base station does not configure the UE 15 to perform measurement reporting.

At 604, the base station of the RAN 20 may send an RRC connection setup message to indicate establishment of the RRC connection. At 606, in response to receiving the RRC connection setup message, the UE 15 may send the small data payload to the base station as part of an RRC setup complete message. The RRC setup complete message may include, for example, a KSI and sequence number and the small data payload in encrypted form. The small data payload may be sent as a NAS PDU in a NAS container in some embodiments.

At 608, the base station may forward the encrypted small data payload (e.g., in the NAS container) to the MME of the SGSN/MME 58 in an S1 Application Protocol (S1-AP) initial context message. The MME may be configured to decrypt the small data payload and add identity information of the UE 15 to a message that includes the small data payload to the MTC-IWF 54.

The SGSN/MME 58 may be configured to forward the small data payload to the MTC/IWF 54 over the T5a/T5b or S6m reference points. In one embodiment, at 610, the SGSN/MME 58 may forward the small data payload to the HLR/HSS 56 (e.g., over Gr/S6a/S6d reference points of) and, at 612, the HLR/HSS may forward the small data payload to the MTC-IWF 54 over the S6m reference. In another embodiment, at 614, the SGSN/MME 58 may be configured to forward the small data payload to the MTC-IWF 54 directly over the T5a/T5b reference point.

At 616, the MTC-IWF 54 may forward the small data payload to the SCS 52 (e.g., over the Tsp reference point). The SCS 52 may further forward the small data payload to an Application server 26.

At 618, the SGSN/MME 58 may send an acknowledgement that the small data payload has been received by the SGSN/MME 58 or forwarded to the MTC-IWF 54. The acknowledgement may be in a message that includes an MTC data acknowledgement information element in an encrypted NAS PDU to the base station in an S1 downlink NAS transport message. In some embodiments, the message may further include an information element that allows the MME of the SGSN/MME 58 to request the base station of the RAN 20 to release the RRC connection.

At 620, the base station of the RAN 20 may send the acknowledgement message to the UE 15 and release the RRC connection in an RRC connection release message. The base station may include an MTC data acknowledgement information element as a NAS PDU within the RRC connection release message.

In some embodiments, the UE 15 may perform NAS signaling instead of actions at 602-606 such as, for example, a tracking area update, service request, attach request, and the like and include the uplink small data payload to the SGSN/MME 58 using NAS signaling. In some embodiments, the UE 15 may perform RRC signaling to include the uplink small data payload to the RAN 20, which may forward the small data payload to the SGSN/MME 58 using S1 . S1 may be shared and not on a per UE basis.

According to various embodiments, a small data payload may be transmitted to the wireless communication network (e.g., the SGSN/MME) from the UE 15 and/or transmitted to the UE 15 from the wireless communication network (hereinafter "network") using various message types and configurations. For example, the UE 15 may be configured to transmit a small data payload using NAS signaling messages on an uplink (e.g., originated by the UE 15) according to a variety of techniques. The NAS module of the UE 15 may include circuitry that is configured to receive a trigger to send a small data payload to the network and generate a NAS message including the small data payload. The AS module of the UE 15 may include circuitry coupled with the NAS circuitry and configured to transmit the NAS message including the small data payload to the network. The trigger may be received, for example, from the MTC application 24 or from the network according to various embodiments.

In one embodiment, a small data payload may be sent by the UE 15 to the network on the uplink by including the small data payload in a small data container information element (IE) in a NAS message such as, for example, an attach request message, a routing area update request message, or a tracking area update request message. The small data container IE may be an optional IE that is included with the NAS if a communication type IE (e.g., attach type IE 800 of FIG. 8, additional update type IE 900 of FIG. 9, or update type IE 1000 of FIG. 10) in the NAS message is configured to indicate that the UE 15 is communicating (e.g., connecting/attaching/requesting service) with the network to transmit the small data payload.

Figure 7:
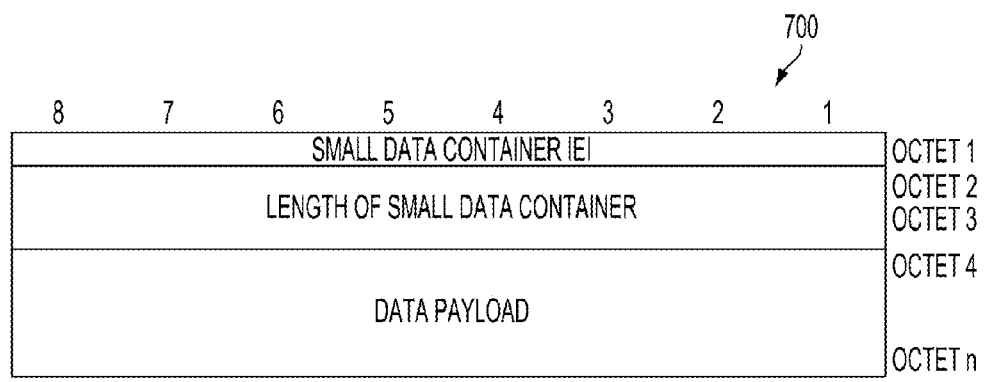
FIG. 7 schematically illustrates a small data container information element (IE), in accordance with some embodiments.

FIG. 7 schematically illustrates a small data container IE 700, in accordance with various embodiments. The small data container IE 700 may be configured to carry the small data payload in the NAS message. The small data container IE 700 may include one or more bits to indicate features of the small data container IE 700. For example, in some embodiments, the small data container IE 700 may include a first octet (octet 1) of eight bits for a small data container information element identifier (IEI) to identify the small data container IE 700, a second octet (octet 2) and third octet (octet 3) to indicate a size or length of the small data payload, and a fourth octet (octet 4) to an nth octet (octet n) to carry the small data payload. In some embodiments, the size of the data payload field may vary from 1 to 128 octets. The small data container IE 700 may be a type 6 information element such as, for example, a type-length value element (TLV-E), in some embodiments. The small data container IE 700 may be configured with other allocations of bits to indicate features of the small data container IE 700 in other embodiments.

Figure 8:
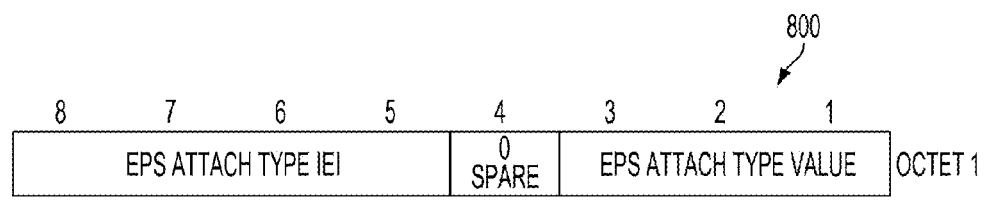
FIG. 8 schematically illustrates an attach type IE, in accordance with various embodiments.

FIG. 8 schematically illustrates an attach type IE 800, in accordance with various embodiments. Referring to FIGS. 2, 7 and 8, in some embodiments, the NAS message sent by the UE 15 to the network may be an attach request message including the attach type IE 800 as the communication type IE. The attach request message may include the small data container IE 700, which may carry the small data payload.

In some embodiments, the small data container IE 700 may be included in the attach request message based on a determination that the attach type IE 800 is configured to indicate that the UE 15 is communicating with the network to transmit the small data payload. The attach type IE 800 may include, for example, one or more bits for an attach type value that is configured to indicate whether the UE 15 is communicating for a small data transmission. In some embodiments, the attach type IE 800 may include three bits of a first octet (octet 1) to indicate an evolved packet system (EPS) attach type value, a bit of the first octet to indicate a spare feature (coded as 0), and four bits to indicate an EPS attach type IEI, as can be seen in FIG. 8.

Table 1 depicts various example EPS attach type values. In some embodiments, the EPS attach type value indicates EPS small data attach to indicate that the UE 15 is communicating to transmit the small data payload if a first bit (Bit 1) of the three bits has a value of 0, a second bit (Bit 2) of the three bits has a value of 0, and a third bit (Bit 3) has a value of 0. Other values of the three bits may indicate EPS attach, combined/IMSI attach, EPS emergency attach, and reserved communication as indicated in Table 1. Other possible values for the three bits may be unused and may be interpreted as EPS attach if received by the network. An attach procedure initiation for EPS small data attach may be similar or the same as for EPS attach in some embodiments.

TABLE 1

Example EPS Attach Type Values

| Bit | | | |
|---|---|---|---|
| 3 | 2 | 1 | |
| 0 | 0 | 1 | EPS Attach |
| 0 | 1 | 0 | Combined/IMSI Attach |
| 1 | 0 | 0 | EPS Small Data Attach |
| 1 | 1 | 0 | EPS Emergency Attach |
| 1 | 1 | 1 | Reserved |

Figure 9:
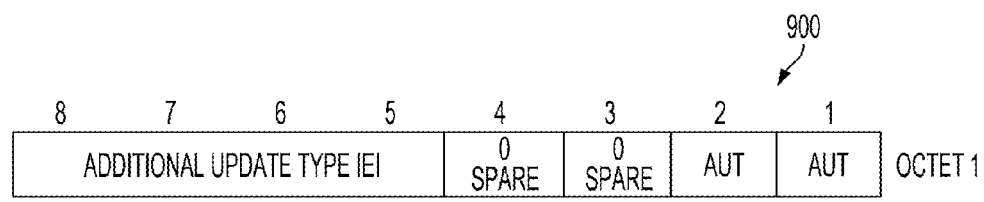
FIG. 9 schematically illustrates an additional update type IE, in accordance with various embodiments.

FIG. 9 schematically illustrates an additional update type IE 900, in accordance with various embodiments. Referring to FIGS. 2 and 7-9, in some embodiments, the UE 15 may send the small data payload in a small data container IE 700 included in the attach request message if an additional update type IE 900 is included in the message and is set to a value to indicate that the UE 15 is communicating with the network to transmit the small data payload.

The additional update type IE 900 may include, for example, one or more bits for an additional update type (AUT) value that is configured to indicate whether the UE 15 is communicating for a small data transmission. In some embodiments, the additional update type IE 900 may include two bits of a first octet (octet 1) to indicate an AUT value, two bits of the first octet to indicate spare features (coded as 0), and four bits to indicate an additional update type IEI, as can be seen in FIG. 9.

Table 2 depicts various example AUT values. In some embodiments, the AUT value provides small data indication to indicate that the UE 15 is communicating to transmit the small data payload if a first bit (Bit 1) of the two bits has a value of 0 and a second bit (Bit 2) of the two bits has a value of 1. Other values of the two bits may indicate no additional information, short message service (SMS) only indication or reserved communication as indicated in Table 2. If the AUT value indicates no additional information (Bit 1 and 2 equal to 0), the attach request message may be interpreted as a combined attach or combined tracking area update.

TABLE 2

Example AUT Values

| Bit 2 | Bit 1 | |
|---|---|---|
| 0 | 0 | No additional information. If received, shall be interpreted as combined attach or combined tracking area update. |
| 0 | 1 | SMS Only Indication |
| 1 | 0 | Small Data Indication |
| 1 | 1 | Reserved |

The additional update type information element may provide information about a type of request for a combined attach or a combined tracking area update procedure. The combined attach procedure may be used by the UE 15 in operation modes such as, for example, circuit switched/packet switched (CS/PS) modes 1 or 2 to respectively attach for both EPS and non-EPS services or both EPS services and "SMS only." The attach type IE 800 may indicate that the UE 15 is requesting a combined EPS/IMSI attach and informs the network that the UE 15 is capable and configured to use circuit switched (CS) fallback and/or SMS over service gateways (SGs). If the UE 15 requests SMS service but not CS fallback, the UE 15 may include an SMS only indication in the additional update type IE 900. If the UE 15 requests only small data service, the UE 15 may include a small data indication in the additional update type IE 900.

Table 3 depicts example content of an attach request message. The attach request message may include values for fields IEI, information element, type/reference, presence, format, and length, as can be seen. The presence field includes values to indicate whether presence of the information element is mandatory (M) or optional (O). The format field includes values to indicate Value only (V), Type only (T), Type and Value (TV), Length and Value (LV), Type, Length, and Value (TLV), Length and Value for Evolved Packet System (EPS) Mobility Management (EMM) and/or EPS Sessions Management (ESM) (LV-E), TLV for EMM and/or ESM (TLV-E). The length field includes values to indicate a size or length in octets of the information element. The attach request message may include a small data container IE 700, EPS attach type IE 800, and/or additional update type IE 900, as described herein. The attach request message may include other formats or values in other embodiments.

TABLE 3

Example Content of an Attach Request Message

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach request message identity | Message type 9.8 | M | V | 1 |
| | EPS attach type | EPS attach type | M | V | ½ |
| | NAS key set identifier | NAS key set identifier 9.9.3.21 | M | V | ½ |
| | EPS mobile identity | EPS mobile identity 9.9.3.12 | M | LV | 5-12 |
| | UE network capability | UE network capability 9.9.3.34 | M | LV | 3-14 |
| | ESM message container | ESM message container 9.9.3.15 | M | LV-E | 5-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |

TABLE 3-continued

Example Content of an Attach Request Message

| IEI | Information Element | Type/Reference | Presence | Format | Length |
|---|---|---|---|---|---|
| 40 | Supported Codecs | Supported Codec List 9.9.2.10 | O | TLV | 5-n |
| F- | Additional update type | Additional update type | O | TV | 1 |
| 5D | Voice domain preference and UE's usage setting | Voice domain preference and UE's usage setting 9.9.3.44 | O | TLV | 3 |
| D- | Device properties | Device properties 9.9.2.0A | O | TV | 1 |
| E- | Old GUTI type | GUTI type 9.9.3.45 | O | TV | 1 |
| TBD | Small Data Container | Small Data Container | O | TLV-E | 4-n |

Figure 10:
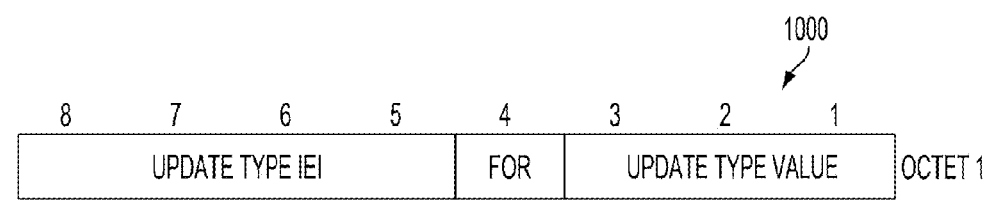
FIG. 10 schematically illustrates an update type IE, in accordance with various embodiments.

FIG. 10 schematically illustrates an update type IE 1000, in accordance with various embodiments. Referring to FIGS. 2, 7 and 10, in some embodiments, the NAS message sent by the UE 15 to the network may be a routing area update request message including the update type IE 1000 as the communication type IE. The routing area update request message may include the small data container IE 700 including the small data payload.

In some embodiments, the small data container IE 700 may be included in the routing area update request message based on a determination that the update type IE 1000 is configured to indicate that the UE 15 is communicating with the network to transmit the small data payload. The update type IE 1000 may include, for example, one or more bits for an update type value that is configured to indicate whether the UE 15 is communicating for a small data transmission. In some embodiments, the update type IE 1000 may include three bits of a first octet (octet 1) to indicate an update type value, a bit of the first octet to indicate a follow on request (FOR) feature, and four bits to indicate an update type IEI, as can be seen in FIG. 10. In some embodiments, the bit associated with the FOR may have a value of 0 to indicate that no follow on request is pending and a value of 1 to indicate that a follow on request is pending.

Table 4 depicts various example update type values. In some embodiments, the update type value may indicate periodic updating with small data if a first bit (Bit 1) of the three bits has a value of 0, a second bit (Bit 2) of the three bits has a value of 0, and a third bit (Bit 3) of the three bits has a value of 1. The update type value may indicate routing area (RA) updating with small data if the first bit has a value of 1, the second bit has a value of 0, and the third bit has a value of 1. Other values of the three bits may indicate RA updating, combined RA/Location Area (LA) updating, combined RA/LA updating with IMSI attach, and periodic updating as indicated in Table 4. Other possible values for the three bits may be reserved.

TABLE 4

Example Update Type Values

| Bit | | | |
|---|---|---|---|
| 3 | 2 | 1 | |
| 0 | 0 | 0 | RA Updating |
| 0 | 0 | 1 | Combined RA/LA Updating |
| 0 | 1 | 0 | Combined RA/LA Updating with IMSI attach |
| 0 | 1 | 1 | Periodic Updating |
| 1 | 0 | 0 | Periodic Updating with Small Data |
| 1 | 0 | 1 | RA Updating with Small Data |

Table 5 depicts example content of a routing area update request message. The routing area update request message may include values for fields IEI, information element, type/reference, presence, format, and length, as can be seen. The routing area update request message may include an update type IE 1000 and/or small data container IE 700 as described herein. The routing area update request message may include other formats or values in other embodiments.

TABLE 5

Example Content of a Routing Area Update Request Message

| IEI | Information Element | Type/Reference | Presence | Format | Length |
|---|---|---|---|---|---|
| | Protocol discriminator | Protocol discriminator 10.2 | M | V | ½ |
| | Skip indicator | Skip indicator 10.3.1 | M | V | ½ |
| | Routing area update request message identity | Message type 10.4 | M | V | 1 |
| | Update type | Update type | M | V | ½ |
| | GPRS ciphering key sequence number | Ciphering key sequence number 10.5.1.2 | M | V | ½ |
| | Old routing area identification | Routing area identification 10.5.5.15 | M | V | 6 |
| | MS Radio Access capability | MS Radio Access capability 10.5.5.12a | M | LV | 6-51 |
| 19 | Old P-TMSI signature | P-TMSI signature 10.5.5.8 | O | TV | 4 |

TABLE 5-continued

Example Content of a Routing Area Update Request Message

| IEI | Information Element | Type/Reference | Presence | Format | Length |
|---|---|---|---|---|---|
| 17 | Requested READY timer value | GPRS Timer 10.5.7.3 | O | TV | 2 |
| 27 | DRX parameter | DRX parameter 10.5.5.6 | O | TV | 3 |
| 9- | TMSI status | TMSI status 10.5.5.4 | O | TV | 1 |
| 18 | P-TMSI | Mobile identity 10.5.1.4 | O | TLV | 7 |
| 31 | MS network capability | MS network capability 10.5.5.12 | O | TLV | 4-10 |
| 32 | PDP context status | PDP context status 10.5.7.1 | O | TLV | 4 |
| 33 | PS LCS Capability | PS LCS Capability 10.5.5.22 | O | TLV | 3 |
| 35 | MBMS context status | MBMS context status 10.5.7.6 | O | TLV | 2-18 |
| 58 | UE network capability | UE network capability 10.5.5.26 | O | TLV | 4-15 |
| 1A | Additional mobile identity | Mobile identity 10.5.1.4 | O | TLV | 7 |
| 1B | Additional old routing area identification | Routing area identification 2 10.5.5.15a | O | TLV | 8 |
| 11 | Mobile station classmark 2 | Mobile station classmark 2 10.5.1.6 | O | TLV | 5 |
| 20 | Mobile station classmark 3 | Mobile station classmark 3 10.5.1.7 | O | TLV | 2-34 |
| 40 | Supported Codecs | Supported Codec List 10.5.4.32 | O | TLV | 5-n |
| 5D | Voice domain preference and UE's usage setting | Voice domain preference and UE's usage setting 10.5.5.28 | O | TLV | 3 |
| E- | P-TMSI type | P-TMSI type 10.5.5.29 | O | TV | 1 |
| D- | Device properties | Device properties 10.5.7.8 | O | TV | 1 |
| TBD | Small Data Container | Small Data Container | O | TLV-E | 4-n |

Figure 11:
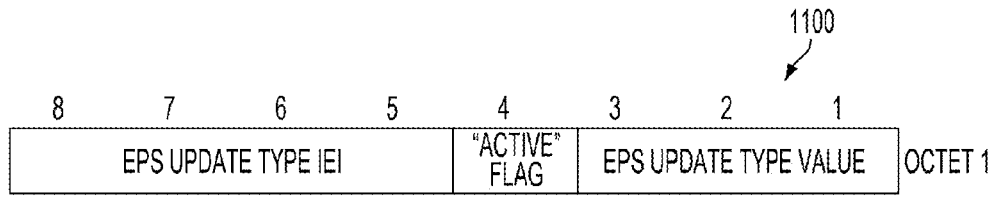
FIG. 11 schematically illustrates another update type IE, in accordance with various embodiments.

FIG. 11 schematically illustrates another update type IE 1100, in accordance with various embodiments. The update type IE 1100 may be an EPS update type IE in some embodiments. Referring to FIGS. 2, 7, 9 and 11, in some embodiments, the NAS message sent by the UE 15 to the network may be a tracking area update request message including the update type IE 1100 as the communication type IE. The tracking area update request message may include the small data container IE 700 including the small data payload.

In some embodiments, the small data container IE 700 may be included in the tracking area update request message based on a determination that the update type IE 1100 is configured to indicate that the UE 15 is communicating with the network to transmit the small data payload. The update type IE 1100 may include, for example, one or more bits for an update type value (e.g., EPS update type value) that is configured to indicate whether the UE 15 is communicating for a small data transmission. In some embodiments, the update type IE 1100 may include three bits of a first octet (octet 1) to indicate the update type value, a bit of the first octet to indicate an "Active" flag feature, and four bits to indicate an update type IEI (e.g., EPS update type IEI), as can be seen in FIG. 11. In some embodiments, the bit associated with the "Active" flag feature may have a value of 0 to indicate that no bearer establishment is requested and a value of 1 to indicate that bearer establishment is requested.

Table 6 depicts various example update type values. In some embodiments, the update type value may indicate tracking area updating with small data if a first bit (Bit 1) of the three bits has a value of 0, a second bit (Bit 2) of the three bits has a value of 0, and a third bit (Bit 3) of the three bits has a value of 1. The update type value may indicate periodic updating with small data if the first bit has a value of 1, the second bit has a value of 0, and the third bit has a value of 1. Other values of the three bits may indicate TA updating, combined TA/LA updating, combined TA/LA updating with IMSI attach, and periodic updating as indicated in Table 6. Other possible values for the three bits may be used in other embodiments.

TABLE 6

Example Update Type Values

| Bit | | | |
|---|---|---|---|
| 3 | 2 | 1 | |
| 0 | 0 | 0 | TA updating |
| 0 | 0 | 1 | combined TA/LA updating |
| 0 | 1 | 0 | combined TA/LA updating with IMSI attach |
| 0 | 1 | 1 | periodic updating |
| 1 | 0 | 0 | TA Updating with Small Data |
| 1 | 0 | 1 | periodic updating with Small Data |

In some embodiments, the tracking area update request message may include an additional update type IE 900 and may further include the small data payload in a small data container IE 700 if the additional update type IE 900 is set to a value indicating small data (e.g., as described in connection with the additional update type IE 900 of FIG. 9).

Table 7 depicts example content of a tracking area update request message. The tracking area update request message may include values for fields IEI, information element, type/reference, presence, format, and length, as can be seen. The tracking area update request message may include an update type IE 1100 (e.g., EPS update type), additional update type IE 900, and/or small data container IE 700 as described herein. The tracking area update request message may include other formats or values in other embodiments.

area update request message received from the UE 15 (e.g., on an uplink). The UE 15 (e.g., AS circuitry) may be configured to receive the routing area update accept message.

The routing area update accept message may include a small data container IE 700 including a small data payload to be sent to the UE 15 if an update result value of the update result IE 1200 is configured to indicate that the UE 15 is communicating for a small data transmission. The update

TABLE 7

Example Content of a Tracking Area Update Request Message

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Tracking area update request message identity | Message type 9.8 | M | V | 1 |
|  | EPS update type | EPS update type | M | V | ½ |
|  | NAS key set identifier | NAS key set identifier 9.9.3.21 | M | V | ½ |
|  | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type | O | TV | 1 |
| 5D | Voice domain preference and UE's usage setting | Voice domain preference and UE's usage setting 9.9.3.44 | O | TLV | 3 |
| E- | Old GUTI type | GUTI type 9.9.3.45 | O | TV | 1 |
| D- | Device properties | Device properties 9.9.2.0A | O | TV | 1 |
| TBD | Small Data Container | Small Data Container | O | TLV-E | 4-n |

Figure 12:
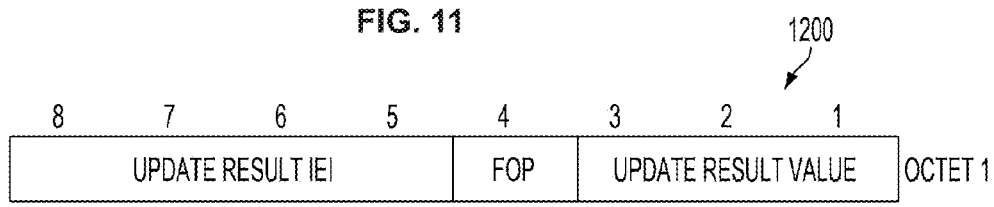
FIG. 12 schematically illustrates an update result IE, in accordance with various embodiments.

FIG. 12 schematically illustrates an update result IE 1200, in accordance with various embodiments. Referring to FIGS. 2, 7, and 12, in some embodiments, the network may be configured to send a routing area update accept message to the UE 15 (e.g., on a downlink) in response to a routing area update request message received from the UE 15 (e.g., on an uplink). The UE 15 (e.g., AS circuitry) may be configured to receive the routing area update accept message.

result IE 1200 may include, for example, one or more bits for an update result value that is configured to indicate that the routing area (RA) is updated with small data. In some embodiments, the update result IE 1200 may include three bits of a first octet (octet 1) to indicate the update result value, a bit of the first octet to indicate a follow on proceed (FOP) feature, and four bits to indicate an update result IEI, as can be seen in FIG. 12. In some embodiments, the bit associated with the FOP feature may have a value of 0 to indicate that follow on proceed is pending and a value of 1 to indicate that no follow on proceed is pending. Other possible values for the three bits may be reserved.

Table 8 depicts various example update result values (e.g., EPS update result values). In some embodiments, the update result value may indicate routing area updated with small data if a first bit (Bit 1) of the three bits has a value of 0, a second bit (Bit 2) of the three bits has a value of 1, and a third bit (Bit 3) of the three bits has a value of 1. Other values of the three bits may indicate RA updated, combined RA/LA updated, RA updated and Idle state Signaling Reduction (ISR) activated, and combined RA/LA updated and ISR activated as indicated in Table 8. Other possible values for the three bits may be used in other embodiments.

TABLE 8

Example Update Result Values

| Bit | | | |
|---|---|---|---|
| 3 | 2 | 1 | |
| 0 | 0 | 0 | RA updated |
| 0 | 0 | 1 | combined RA/LA updated |
| 1 | 0 | 0 | RA updated and ISR activated |
| 1 | 0 | 1 | combined RA/LA updated and ISR activated |
| 1 | 1 | 0 | RA updated with Small Data |

Table 9 depicts example content of a routing area update accept message. The routing area update accept message may include values for fields IEI, information element, type/reference, presence, format, and length, as can be seen. The routing area update accept message may include an update result IE 1200 and/or small data container IE 700 as described herein. The routing area update accept message may include other formats or values in other embodiments.

TABLE 9

Example Content of a Routing Area Update Accept Message

| IEI | Information Element | Type/Reference | Presence | Format | Length |
|---|---|---|---|---|---|
| | Protocol discriminator | Protocol discriminator 10.2 | M | V | ½ |
| | Skip indicator | Skip indicator 10.3.1 | M | V | ½ |
| | Routing area update accept message identity | Message type 10.4 | M | V | 1 |
| | Force to standby | Force to standby 10.5.5.7 | M | V | ½ |
| | Update result | Update result | M | V | ½ |
| | Periodic RA update timer | GPRS Timer 10.5.7.3 | M | V | 1 |
| | Routing area identification | Routing area identification 10.5.5.15 | M | V | 6 |
| 19 | P-TMSI signature | P-TMSI signature 10.5.5.8 | O | TV | 4 |
| 18 | Allocated P-TMSI | Mobile identity 10.5.1.4 | O | TLV | 7 |
| 23 | MS identity | Mobile identity 10.5.1.4 | O | TLV | 7-10 |
| 26 | List of Receive N-PDU Numbers | Receive N-PDU Number list 10.5.5.11 | O | TLV | 4-19 |
| 17 | Negotiated READY timer value | GPRS Timer 10.5.7.3 | O | TV | 2 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| 32 | PDP context status | PDP context status 10.5.7.1 | O | TLV | 4 |
| B- | Network feature support | Network feature support 10.5.5.23 | O | TV | 1 |
| 34 | Emergency Number List | Emergency Number List 10.5.3.13 | O | TLV | 5-50 |
| 35 | MBMS context status | MBMS context status 10.5.7.6 | O | TLV | 2-18 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | T3312 extended value | GPRS timer 3 10.5.7.4a | O | TLV | 3 |
| TBD | Small Data Container | Small Data Container | O | TLV-E | 4-n |

Figure 13:
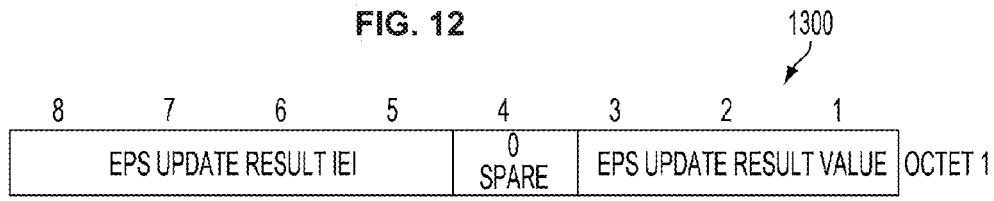
FIG. 13 schematically illustrates another update result IE, in accordance with various embodiments.

FIG. 13 schematically illustrates another update result IE 1300 (e.g., EPS update result IE), in accordance with various embodiments. Referring to FIGS. 2, 7, and 13, in some embodiments, the network may be configured to send a tracking area update accept message to the UE 15 (e.g., on a downlink) in response to a tracking area update request message received from the UE 15 (e.g., on an uplink). The UE 15 (e.g., AS circuitry) may be configured to receive the tracking area update accept message.

The tracking area update accept message may include a small data container IE 700 including a small data payload to be sent to the UE 15 if an update result value (e.g., EPS update result value) of the update result IE 1300 is configured to indicate that the UE 15 is communicating for a small data transmission. The update result IE 1300 may include, for example, one or more bits for an update result value that is configured to indicate that the tracking area (TA) is updated with small data. In some embodiments, the update result IE 1300 may include three bits of a first octet (octet 1) to indicate the update result value, a bit of the first octet to indicate a spare feature (coded as 0), and four bits to indicate an update result IEI (e.g., EPS udpate result IEI), as can be seen in FIG. 13. Other possible values for the three bits may be reserved.

Table 10 depicts various example update result values (e.g., EPS update result values). In some embodiments, the update result value may indicate tracking area updated with small data if a first bit (Bit 1) of the three bits has a value of 0, a second bit (Bit 2) of the three bits has a value of 1, and a third bit (Bit 3) of the three bits has a value of 1. Other values of the three bits may indicate TA updated, combined TA/LA updated, TA updated and ISR activated, and combined TA/LA updated and ISR activated as indicated in Table 10. Other possible values for the three bits may be used in other embodiments.

TABLE 10

Example Update Result Values

| Bit | | | |
|---|---|---|---|
| 3 | 2 | 1 | |
| 0 | 0 | 0 | TA updated |
| 0 | 0 | 1 | combined TA/LA updated |
| 1 | 0 | 0 | TA updated and ISR activated |
| 1 | 0 | 1 | combined TA/LA updated and ISR activated |
| 1 | 1 | 0 | TA updated with Small Data |

Table 11 depicts example content of a tracking area update accept message. The tracking area update accept message may include values for fields IEI, information element, type/reference, presence, format, and length, as can be seen. The tracking area update accept message may include an update result IE 1300 and/or small data container IE 700 as described herein. The tracking area update accept message may include other formats or values in other embodiments.

TABLE 11

Example Content of a Tracking Area Update Accept Message

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update accept message identity | Message type 9.8 | M | V | 1 |
| | EPS update result | EPS update result | M | V | ½ |
| | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| TBD | Small Data Container | Small Data Container | O | TLV-E | 4-n |

The network and/or UE 15 may use other techniques and configurations to send a small data payload. In one embodiment, the network (e.g., MME) may send a paging message (e.g., 308d of FIG. 3d) on downlink to RAN 20 (e.g., a base station such as eNB station), which may forward the paging message to the UE 15. The paging message may include a small data indicator IE and/or a small data container IE 700 according to various embodiments.

Table 12 depicts example content of a paging message from the network to the RAN 20, in accordance with various embodiments. The paging message may include values for fields IE/Group Name, presence, range, IE type and reference, semantics description, criticality, and assigned criticality as can be seen. The paging message may include small data container IE 700 and/or a small data indicator, which may be optional elements included in the paging message, in some embodiments. The paging message may include a list of tracking area identities (TAIs) and/or Closed Subscriber Group (CSG) Id list. The term "maxnoofTAIs" in the range field may refer to a maximum number of TAIs and may have a value of 256 in some embodiments. The term "maxnoofC-SGIds" in the range field may refer to a maximum number of CSG Ids within the CSG Id List and may have a value of 256 in some embodiments. The criticality field may include values such as, for example, YES, EACH, or GLOBAL. The assigned criticality field may include values such as, for example, "ignore". The paging message may include other formats or values in other embodiments.

Table 13 depicts an example small data indicator IE. The small data indicator IE may indicate that the network has a small data payload to transmit to the UE 15. The small data indicator IE may include values for fields IE/Group Name, presence, range, IE type and reference, and semantics description, as can be seen. In some embodiments, the IE type and reference field of the small data indicator may be ENUMERATED (true, . . . ) to indicate a data type.

TABLE 13

Example Small Data Indicator IE

| IE/Group Name | Presence | Range | IE type and reference | Semantics description |
| --- | --- | --- | --- | --- |
| Small Data Indicator | O | | ENUMERATED (true, . . .) | |

In some embodiments, the paging message sent by the network (e.g., SGSN/MME 58) to the RAN 20 may include a small data indicator IE and no small data payload (e.g., no small data container IE). The RAN 20 may send the small data indicator to the UE 15 in a paging message. Table 14 depicts an example paging message format for a paging message sent to the UE 15 from the RAN 20 for a case where the paging message includes the small data indicator and

TABLE 12

Example Content of a Paging Message from Network to RAN

| IE/Group Name | Presence | Range | IE type and reference | Semantics description | Criticality | Assigned Criticality |
| --- | --- | --- | --- | --- | --- | --- |
| Message Type | M | | | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to <maxnoofTAIs> | | | EACH | ignore |
| >>TAI | M | | 9.2.3.16 | | — | |
| CSG Id List | | 0 . . . 1 | | | GLOBAL | ignore |
| >CSG Id | | 1 to <maxnoofCSGId> | 9.2.1.62 | | — | |
| Paging Priority | O | | 9.2.1.78 | | YES | ignore |
| Small Data Indicator | O | | | | YES | ignore |
| Small Data Container | O | | | | YES | ignore | does not include the small data container (e.g., using techniques described in connection with FIG. 3d). The paging message format is in Abstract Syntax Notation One (ASN.1).

TABLE 14

Example Paging Message Format from RAN to UE

```
-- ASN1START
Paging ::=                  SEQUENCE {
    pagingRecordList        PagingRecordList        OPTIONAL,  -- Need ON
    systemInfoModification  ENUMERATED {true}       OPTIONAL,  -- Need ON
    etws-Indication         ENUMERATED {true}       OPTIONAL,  -- Need ON
    nonCriticalExtension    Paging-v890-IEs         OPTIONAL
}
Paging-v890-IES ::=         SEQUENCE {
    lateNonCriticalExtension   OCTET STRING         OPTIONAL,  -- Need OP
```

TABLE 14-continued

Example Paging Message Format from RAN to UE

```
        nonCriticalExtension           Paging-v920-IEs              OPTIONAL
}
Paging-v920-IEs ::=         SEQUENCE {
    cmas-Indication-r9          ENUMERATED {true}           OPTIONAL,  -- Need ON
    nonCriticalExtension        Paging-v11-IEs
}
Paging-v11-IEs ::=          SEQUENCE {
    smalldata-Indication-r11    ENUMERATED {true}           OPTIONAL,  -- Need ON
    nonCriticalExtension        SEQUENCE { }                OPTIONAL   -- Need OP
}
PagingRecordList ::=        SEQUENCE (SIZE (1..maxPageRec)) OF PagingRecord
PagingRecord ::=            SEQUENCE {
    ue-Identity                 PagingUE-Identity,
    cn-Domain                   ENUMERATED {ps, cs},
    ...
}
PagingUE-Identity ::=       CHOICE {
    s-TMSI                      S-TMSI,
    imsi                        IMSI,
    ...
}
IMSI ::=                    SEQUENCE (SIZE (6..21)) OF IMSI-Digit
IMSI-Digit ::=              INTEGER (0..9)
-- ASN1STOP
```

The UE 15 may communicate with the eNB to establish a connection in response to receiving the paging message including the small data indicator IE. In some embodiments, the UE 15 may send an RRC connection request message to the RAN 20 in response to the paging message. The RAN 20 may send an RRC connection setup message to the UE 15 in response to receiving the RRC connection request message. The UE 15 may send an RRC connection setup complete message and a service request message (e.g., extended service request message) to the network (e.g., forwarded to the MME of the SGSN/MME 58 by the RAN 20). The service request message may include a service type IE (e.g., service type IE 1400) having a service type value to indicate a small data service request. The network may send the small data payload to the UE 15 in a NAS message in response to the service request message.

Figure 14:
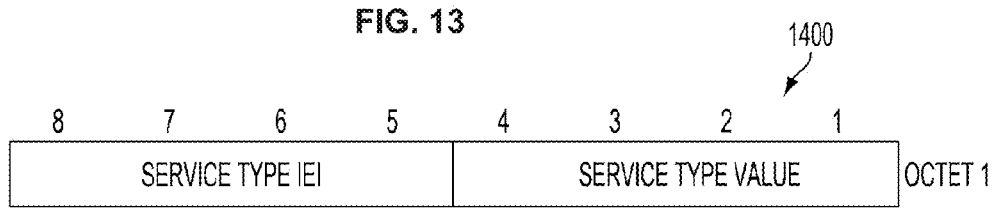
FIG. 14 schematically illustrates a service type IE, in accordance with various embodiments.

FIG. 14 schematically illustrates a service type IE 1400, in accordance with various embodiments. The service type IE may specify a purpose of a service request procedure and may be a Type 1 information element. Referring to FIGS. 2, 7, and 14, in some embodiments, the UE 15 may or may not have a small data payload to send to the network in response to the paging message having the small data indicator IE. If the UE 15 has no small data payload to send to the network, upon request by the network, the service type value of the service type IE 1400 may have a value that indicates a small data service request and no small data container (e.g., small data container IE 700). If the UE 15 has a small data payload to send to the network, upon request by the network, the service type value of the service type IE 1400 may have a value that indicates a small data service request with a small data container. In such a case, the small data container IE 700 (with the small data payload) may be included in the service request message. The service type IE 1400 may include, for example, four bits of a first octet (octet 1) to indicate the service type value and another four bits of the first octet to indicate service type IEI, as can be seen in FIG. 14.

Table 15 depicts various example service type values. In some embodiments, the service type value may indicate a small data service request with no small data container if a first bit (Bit 1) of the four bits has a value of 0, a second bit (Bit 2) of the four bits has a value of 0, a third bit (Bit 3) of the four bits has a value of 1, and a fourth bit (Bit 4) of the four bits has a value of 1. The service type value may indicate a small data service request with a small data container if a first bit (Bit 1) of the four bits has a value of 1, a second bit (Bit 2) of the four bits has a value of 0, a third bit (Bit 3) of the four bits has a value of 1, and a fourth bit (Bit 4) of the four bits has a value of 1 Other values of the four bits may indicate other service type values as indicated in Table 10. Other possible values for the four bits may be used to indicate the small data service request, in other embodiments.

TABLE 15

Example Service Type Values

| Bit | | | | |
|---|---|---|---|---|
| 4 | 3 | 2 | 1 | |
| 0 | 0 | 0 | 0 | mobile originating CS fallback or 1xCS fallback |
| 0 | 0 | 0 | 1 | mobile terminating CS fallback or 1xCS fallback |
| 0 | 0 | 1 | 0 | mobile originating CS fallback emergency call or 1xCS fallback emergency call |
| 0 | 0 | 1 | 1 | unused; shall be interpreted as "mobile originating CS fallback or 1xCS fallback", if received by the network |
| 0 | 1 | 0 | 0 | unused; shall be interpreted as "mobile originating CS fallback or 1xCS fallback", if received by the network |
| 1 | 0 | 0 | 0 | packet services via S1 |
| 1 | 0 | 0 | 1 | unused; shall be interpreted as "packet services via S1", if received by the network |
| 1 | 0 | 1 | 0 | unused; shall be interpreted as "packet services via S1", if received by the network |
| 1 | 0 | 1 | 1 | unused; shall be interpreted as "packet services via S1", if received by the network |
| 1 | 1 | 0 | 0 | Small Data Service request, no Small Data Container |
| 1 | 1 | 0 | 1 | Small Data Service request, with Small Data Container |

Table 16 depicts example content of an extended service request message. The extended service request message may include values for fields IEI, information element, type/reference, presence, format, and length, as can be seen. A value of C in the presence filed may indicate that the information element is conditionally optional. The extended service request message may include a service type IE 1400 and/or small data container IE 700 as described herein. In some embodiments, the extended service request message may be sent by the UE 15 to the network to initiate a CS fallback or 1xCS fallback call, response to a mobile terminated CS fallback or 1xCS fallback request from the network, or request the establishment of a NAS signaling connection of the radio and S1 bearers for packet services, if the UE 15 needs to provide additional information that cannot be provided via a service request message. The extended service request message may include other formats or values in other embodiments.

The NAS message container IE 1500 may include one or more bits to indicate features of the NAS message container IE 1500. For example, in some embodiments, the NAS message container IE 1500 may include a first octet (octet 1) of eight bits for a NAS message container IEI to identify the NAS message container IE 1500, a second octet (octet 2) to indicate a size or length of the NAS message container contents, and a third octet (octet 3) to an nth octet (octet n) for NAS message container contents (e.g., to carry the small data payload). The NAS message container IE 1500 may be

TABLE 16

Example Content of an Extended Service Request Message

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Extended service request message identity | Message type 9.8 | M | V | 1 |
| | Service type | Service type | M | V | ½ |
| | NAS key set identifier | NAS key set identifier 9.9.3.21 | M | V | ½ |
| | M-TMSI | Mobile identity 9.9.2.3 | M | LV | 6 |
| B- | Circuit Switched Fallback (CSFB) response | CSFB response 9.9.3.5 | C | TV | 1 |
| 57 | EPS bearer context status | EPS bearer context status 9.9.2.1 | O | TLV | 4 |
| D- | Device properties | Device properties 9.9.2.0A | O | TV | 1 |
| TBD | Small Data Container | Small Data Container | O | TLV-E | 4-n |

The network (e.g., the MME of the SGSN/MME 58) may send a NAS message to the UE 15 including a small data payload in response to receiving the extended service request message from the UE 15, which may or may not include a small data payload from the UE 15 to the network as described. In some embodiments, the NAS message sent by the network to UE 15 is a downlink NAS transport message including the small data payload in a NAS message container IE. The NAS message container IE (e.g., NAS message container IE 1500 of FIG. 15) may include a small data container IE 700 in some embodiments.

Figure 15:
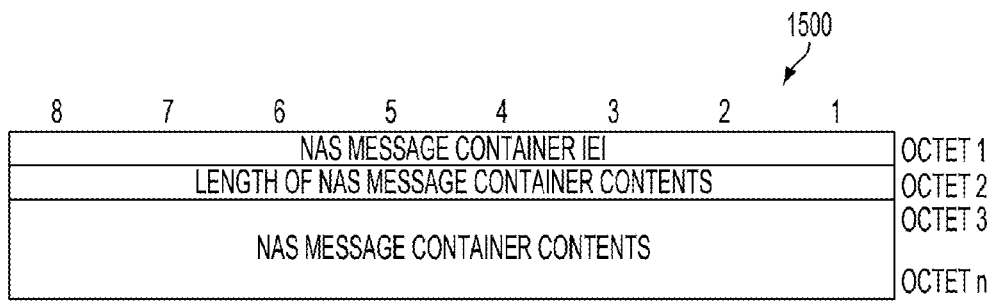
FIG. 15 schematically illustrates a NAS message container IE, in accordance with various embodiments.

FIG. 15 schematically illustrates a NAS message container IE 1500, in accordance with various embodiments. Referring to FIGS. 2, 7 and 15, in some embodiments, the NAS message container IE 1500 may be configured to carry the small data payload in the NAS transport message. In some embodiments, the NAS message container IE 1500 may be sent by the network to the UE 15 to carry an SMS message (e.g., CP-DATA, CP-ACK or CP-ERROR) in an encapsulated format. The NAS message container IE 1500 may be a type 4 information element.

configured with other allocations of bits to indicate features of the NAS message container IE 1500 in other embodiments.

Table 17 depicts example content of a NAS transport message. The NAS transport message may include values for fields IEI, information element, type/reference, presence, format, and length, as can be seen. The NAS transport message may include a NAS message container IE 1500 as described herein. The NAS transport message may include other formats or values in other embodiments. For example, the NAS transport message may include a small data container IE 700 of FIG. 7 in the NAS message container IE. In some embodiments, the NAS transport message may include a small data container IE 700 instead of or in addition to the NAS message container IE. The NAS transport message in Table 17 may represent a downlink NAS transport message. In some embodiments, an uplink NAS transport message may be used to carry a small data payload from the UE 15 to the network. In such embodiments, the Downlink NAS transport message identity IE in Table 17 may be replaced with an Uplink NAS transport message identity IE.

TABLE 17

Example Content of a NAS Transport Message

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Downlink NAS transport message identity | Message type 9.8 | M | V | 1 |
| | NAS message container | NAS message container | M | LV | 3-252 |

Table 18 depicts example content of a Generic NAS Transport message. The Generic NAS Transport message may include values for fields IEI, information element, type/reference, presence, format, and length, as can be seen. The Generic NAS transport message may include other formats or values in other embodiments. For example, the NAS transport message may include a small data container IE 700 of FIG. 7 in the Generic message container IE or the Additional information IE. In some embodiments, the NAS transport message may include a small data container IE 700 instead of or in addition to the Generic message container IE and/or additional information IE. The Generic NAS transport message in Table 18 may represent a downlink Generic NAS transport message. In some embodiments, an Uplink Generic NAS transport message may be used to carry a small data payload from the UE 15 to the network. In such embodiments, the Downlink Generic NAS transport message identity IE in Table 18 may be replaced with an Uplink NAS transport message identity IE.

TABLE 18

Example Content of a Generic NAS Transport Message

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Downlink NAS transport message identity | Message type 9.8 | M | V | 1 |
| | Generic message container type | Generic message container type 9.9.3.42 | M | V | 1 |
| | Generic message container | Generic message container 9.9.3.43 | M | LV-E | 3-n |
| 65 | Additional information | Additional information 9.9.2.0 | O | TLV | 3-n |

According to various embodiments, the network (e.g., MME of the SGSN/MME 58) may send a small data payload to the UE 15 by sending a paging message that includes a small data indicator and the small data payload (e.g., using techniques described in connection with FIG. 3*b*). The paging message may include a small data container (e.g., as depicted in Table 12) that includes the small data payload. Table 19 depicts an example paging message format for a paging message sent to the UE 15 from the RAN 20 for a case where the paging message includes the small data indicator and the small data container carrying the small data payload.

TABLE 19

Example Paging Message Format from RAN to UE

```
-- ASN1START
Paging ::=                    SEQUENCE {
    pagingRecordList              PagingRecordList          OPTIONAL,  -- Need ON
    systemInfoModification        ENUMERATED {true}         OPTIONAL,  -- Need ON
    etws-Indication               ENUMERATED {true}         OPTIONAL,  -- Need ON
    nonCriticalExtension          Paging-v890-IEs           OPTIONAL
}
Paging-v890-IES ::=           SEQUENCE {
    lateNonCriticalExtension      OCTET STRING              OPTIONAL,  -- Need OP
    nonCriticalExtension          Paging-v920-IEs           OPTIONAL
}
Paging-v920-IEs ::=           SEQUENCE {
    cmas-Indication-r9            ENUMERATED {true}         OPTIONAL,  -- Need ON
    nonCriticalExtension          Paging-v11-IEs
}
Paging-v11-IEs ::=            SEQUENCE {
    smalldata-Indication-r11      ENUMERATED {true}         OPTIONAL,  -- Need ON
    smallDataPayload              SmallDataPayload          OPTIONAL,  -- Need OP
    nonCriticalExtension          SEQUENCE { }              OPTIONAL   -- Need OP
}
SmallDataPayload ::=          SEQUENCE{
    data-Payload                  BIT STRING (SIZE(1...256))
...
}
PagingRecordList ::=          SEQUENCE (SIZE (1..maxPageRec)) OF PagingRecord
PagingRecord ::=              SEQUENCE {
    ue-Identity                   PagingUE-Identity,
    cn-Domain                     ENUMERATED {ps, cs},
...
```

TABLE 19-continued

Example Paging Message Format from RAN to UE

```
}
PagingUE-Identity ::=        CHOICE {
    s-TMSI                       S-TMSI,
    imsi                         IMSI,
    ...
}
IMSI ::=                     SEQUENCE (SIZE (6..21)) OF IMSI-Digit
IMSI-Digit ::=               INTEGER (0..9)
-- ASN1STOP
```

According to various embodiments, the network (e.g., MME of the SGSN/MME 58) may send a small data payload to the UE 15 by sending a paging message that includes a small data indicator and the small data payload to the RAN 20 (e.g., using techniques described in connection with FIG. 3c). The paging message may include a small data container (e.g., as depicted in Table 12) that includes the small data payload. The RAN 20 may store/retrieve the small data payload and send a paging message to the UE 15 that includes a small data indicator and does not include the small data payload. The UE 15 may send an RRC connection request to the RAN 20 in response to the paging message. In response to the RRC connection request, the RAN 20 may send an RRC connection setup message to the UE 15 that includes the small data payload. Table 20 depicts an example RRC connection setup message format for an RRC connection setup message including the small data payload that may be sent from the RAN 20 to the UE 15.

At 1602, the method 1600 includes receiving, by a UE 15, a trigger to send a small data payload to a wireless communication network (e.g., BWA network 100 of FIG. 1), hereinafter "network." The trigger can be received from an MTC application 24 communicatively coupled with the UE 15 or from the network. The trigger can include an express request to transmit a small data payload, receipt by the UE 15 of a notification of a small data transmission from the network (e.g., small data indicator) or any other suitable trigger.

At 1604, the method 1600 may further include generating, by the UE 15, a NAS message including the small data payload. According to various embodiments, the NAS message may include, for example, an attach request message, a routing area update request message or a tracking area update request message. The NAS message may include a

TABLE 20

Example RRC Connection Setup Message Format from RAN to UE

```
-- ASN1START
RRCConnectionSetup ::=           SEQUENCE {
    rrc-TransactionIdentifier        RRC-TransactionIdentifier,
    criticalExtensions               CHOICE {
        c1                               CHOICE {
            rrcConnectionSetup-r8            RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture         SEQUENCE { }
    }
}
RRCConnectionSetup-r8-IEs ::=    SEQUENCE {
    radioResourceConfigDedicated     RadioResourceConfigDedicated,
    nonCriticalExtension             RRCConnectionSetup-v8a0-IEs     OPTIONAL
}
RRCConnectionSetup-v8a0-IEs ::= SEQUENCE {
    lateNonCriticalExtension         OCTET STRING                    OPTIONAL, -- Need OP
    nonCriticalExtension             SmallData v11-IEs
}
SmallData__v11__IEs ::=          SEQUENCE {
    smallDataPayload                 SmallDataPayload                OPTIONAL, -- Need OP
    nonCriticalExtension             SEQUENCE { }                    OPTIONAL  -- Need OP
}
SmallDataPayload ::=             SEQUENCE{
    data-Payload                     BIT STRING(SIZE(1...256))
    ...
}
-- ASN1STOP
```

Figure 16:
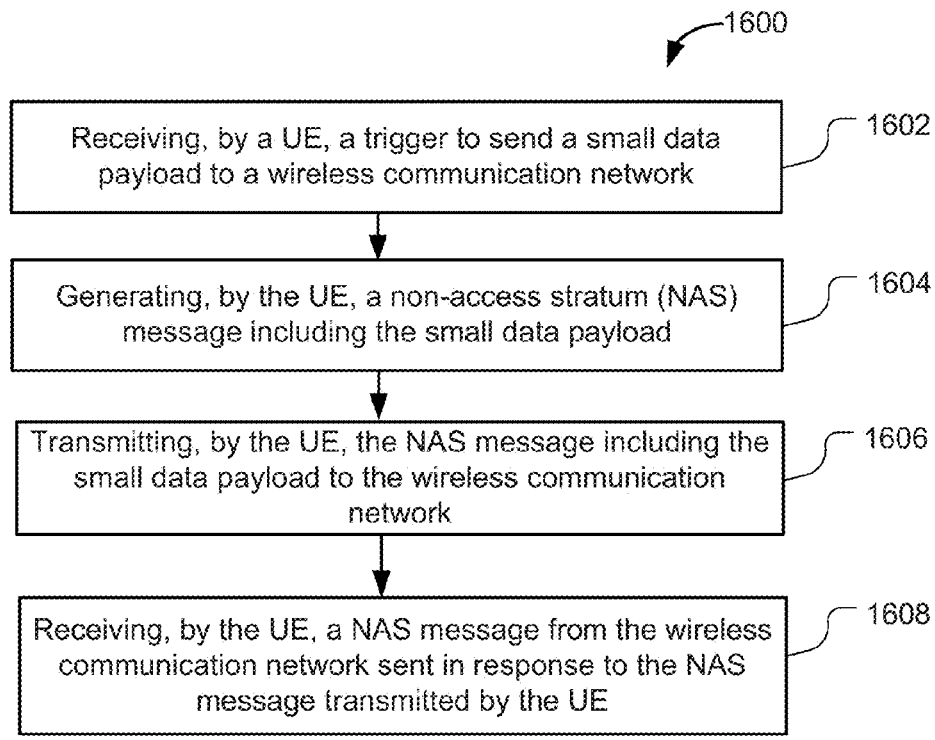
FIG. 16 is a flow diagram of a method for transmitting one or more small data payloads in a wireless communication network, in accordance with some embodiments.

FIG. 16 is a flow diagram of a method 1600 for transmitting one or more small data payloads in a wireless communication network, in accordance with some embodiments. Referring to FIGS. 2 and 16, in some embodiments, the method 1600 may describe actions from a perspective of a UE 15.

communication type information element that may be configured to indicate whether the UE 15 is communicating with the network for a small data purpose (e.g., to transmit the small data payload).

At 1606, the method 1600 may further include transmitting, by the UE 15, the NAS message including the small data payload to the network. The NAS message may be transmitted to a network node (e.g., SGSN/MME 58) via RAN 20.

At 1608, the method 1600 may further include receiving, by the UE 15, a NAS message from the network sent in response to the NAS message transmitted by the UE 15. The NAS message received by the UE 15 may be sent, for example, by the SGSN/MME 58 over the RAN 20. In embodiments where the NAS message transmitted by the UE at 1606 includes a routing or tracking area update request message, the NAS message received by the UE at 1608 may be a respective routing or tracking area update accept message that includes another small data payload from the network to the UE.

Figure 17:
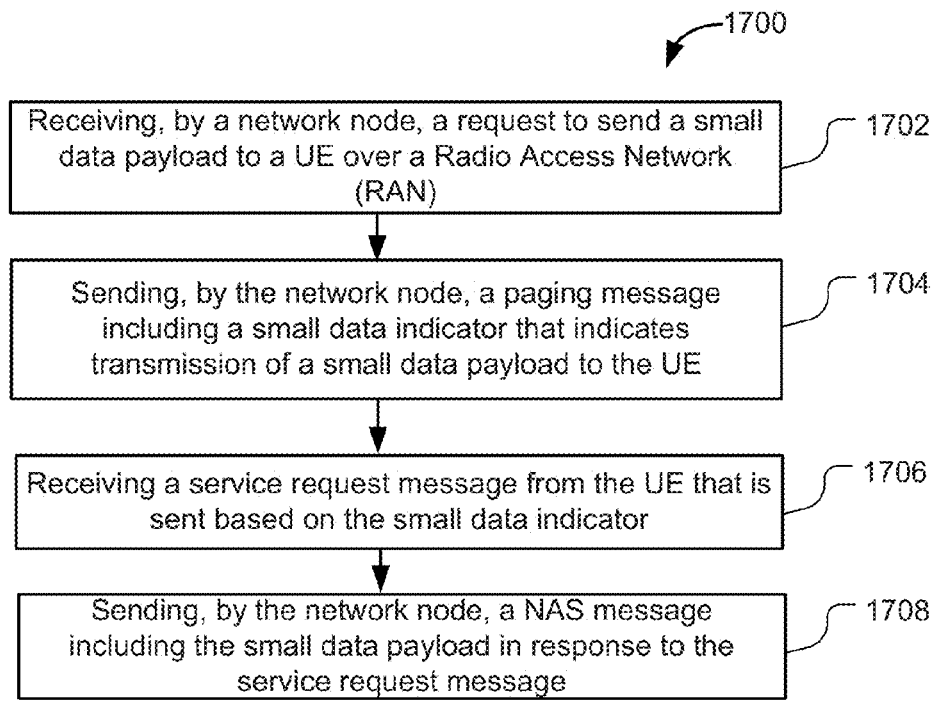
FIG. 17 is a flow diagram of another method for transmitting one or more small data payloads in a wireless communication network, in accordance with some embodiments.

FIG. 17 is a flow diagram of another method 1700 for transmitting one or more small data payloads in a wireless communication network, in accordance with some embodiments. Referring to FIGS. 2 and 17, in some embodiments, the method 1700 may describe actions from a perspective of a network node (e.g., SGSN/MME 58).

At 1702, the method 1700 includes receiving, by a network node, a request to send a small data payload to a UE 15 over a RAN 20. The request may be received, for example, by the MTC-IWF 54, the SCS 52, an MTC application 24 (e.g., via the UE 15), or the Application server 26, but is not limited in this regard, and can be received by any suitable technique.

At 1704, the method 1700 may further include sending, by the network node, a paging message including a small data indicator that indicates transmission of a small data payload to the UE 15. The paging message may be sent to the UE 15 via RAN 20. In some embodiments, the paging message includes the small data payload (e.g., in a small data container IE 700 of FIG. 7). For example, the RAN 20 may receive the small data payload and may either send a paging message including the small data payload to the UE 15 or send the paging message with the small data indicator and subsequently establish a connection (e.g., RRC connection) with the UE 15 and send the small data payload to the UE 15 in an RRC connection message. In other embodiments, the paging message sent at 1704 does not include the small data payload.

At 1706, the method 1700 may further include receiving a service request message from the UE 15 that is sent based on the small data indicator. The service request message may be received from the UE 15 in embodiments where the paging message sent at 1704 does not include the small data payload (e.g., small data payload is at the SGSN/MME 58). For example, the RAN 20 may send a paging message to the UE 15 that includes the small data indicator. The UE 15 and the RAN 20 may establish an RRC connection in response to the paging message and the UE 15 may send a service request message indicating small data service. In some embodiments, the service request message may include a service type IE that is configured to indicate whether the UE 15 has a small data payload to send to the network. In some embodiments, the service request message may include another small data payload (e.g., uplink) from the UE 15 to the network.

At 1708, the method 1700 may further include sending, by the network node, a NAS message including the small data payload in response to the service request message. The NAS message may be a NAS transport message that includes a NAS message container carrying the small data payload.

Figure 18:
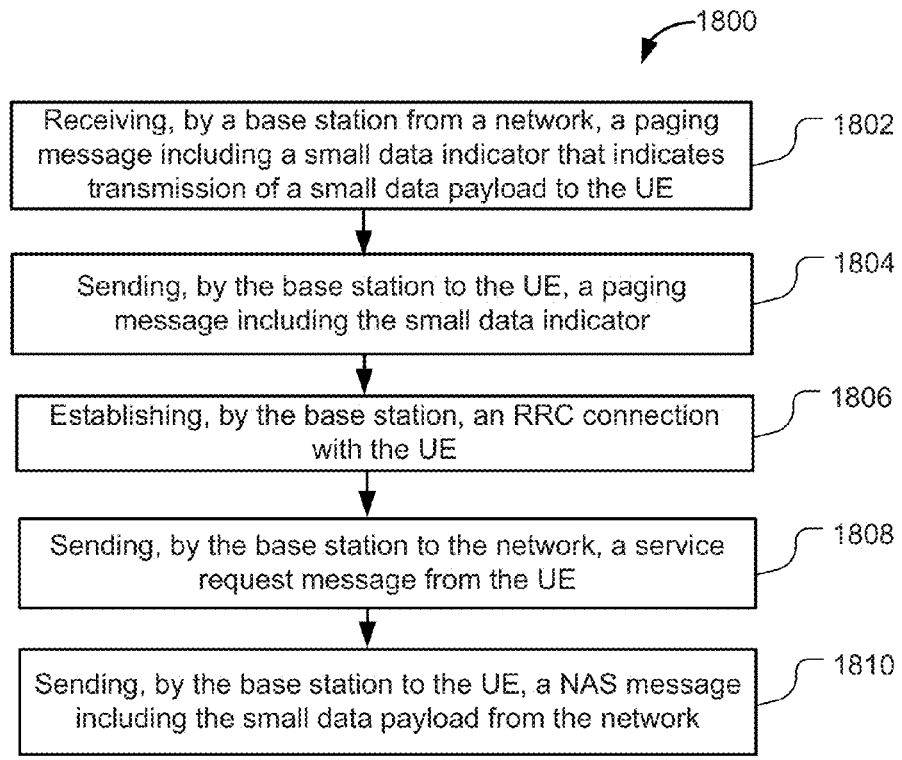
FIG. 18 is a flow diagram of yet another method for transmitting one or more small data payloads in a wireless communication network, in accordance with some embodiments.

FIG. 18 is a flow diagram of yet another method 1800 for transmitting one or more small data payloads in a wireless communication network, in accordance with some embodiments. Referring to FIGS. 2 and 18, in some embodiments, the method 1800 may describe actions from a perspective of a base station (e.g., base station 40 or 42 of FIG. 1).

At 1802, the method 1800 includes receiving, by a base station from a network, a paging message including a small data indicator that indicates transmission of a small data payload to the UE 15. In some embodiments, the paging message received includes a small data payload. In other embodiments, the paging message received does not include a small data payload.

At 1804, the method 1800 may further include sending, by the base station to the UE 15 a paging message including the small data indicator. In embodiments where the paging message received at 1802 includes the small data payload, the paging message sent by the base station at 1804 may include the small data payload. In other embodiments where the paging message received at 1802 includes the small data payload or does not include the small data payload, the paging message sent at 1804 may not include the small data payload.

At 1806, the method 1800 may further include establishing, by the base station, an RRC connection with the UE 15. For example, the UE 15 may send an RRC connection request message in response to the paging message. The base station may receive the RRC connection request message and send an RRC connection setup message in response to the RRC connection request message. In embodiments where the paging message received at 1802 by the base station from the network includes the small data payload and the paging message sent at 1802 by the base station to the UE 15 does not include the small data payload, the base station may include the small data payload in the RRC connection setup message to the UE 15.

At 1808, the method 1800 may further include sending, by the base station to the network, a service request message from the UE 15. The service request message may be sent by the UE 15 in response to the paging message (e.g., small data indicator) sent by the base station at 1804. For example, in embodiments where the paging message received by the base station at 1802 does not include the payload from the network, the base station may receive from the UE 15 an RRC connection setup complete message and an extended service request that indicates small data service in response to the RRC connection setup message to the UE 15. The extended service request may be sent to the network (e.g., SGSN/MME 58) by the base station.

At 1810, the method 1800 may further include sending, by the base station to the UE 15, a NAS message including the small data payload from the network. For example, the network may send the NAS message to the UE 15 via the base station in response to the extended service request.

The methods described in connection with FIGS. 16-18 may comport with embodiments described in connection with FIGS. 1-15 and vice versa. Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 19:
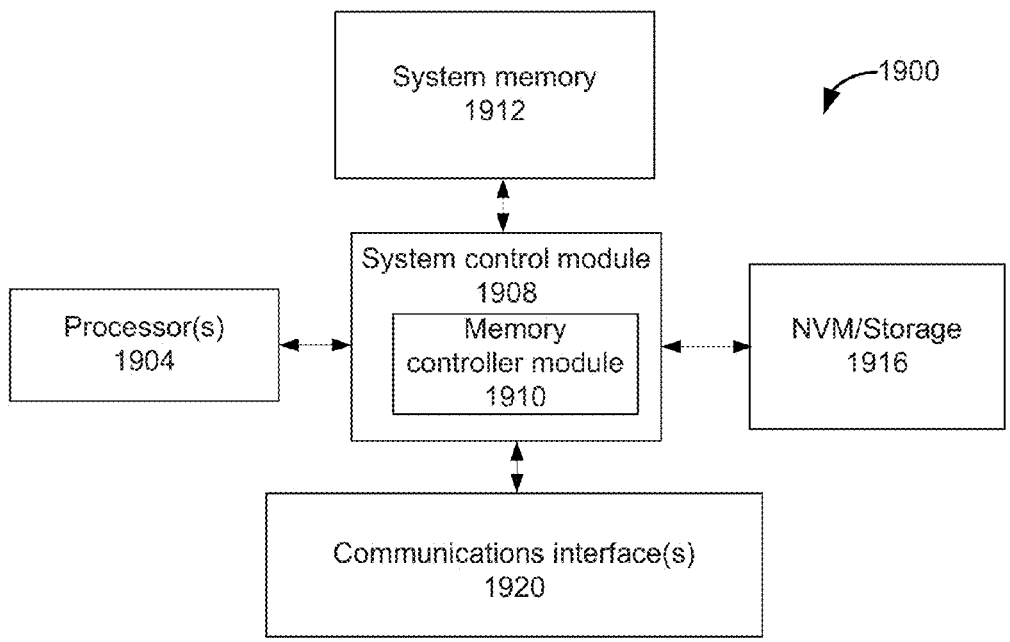
FIG. 19 schematically illustrates an example system that may be used to practice various embodiments described herein.

Embodiments of the present disclosure may be implemented into a system using any suitable hardware and/or software to configure as desired. FIG. 19 schematically illustrates an example system 1900 that may be used to practice various embodiments described herein. FIG. 19 illustrates, for one embodiment, an example system 1900 having one or more processor(s) 1904, system control module 1908 coupled to at least one of the processor(s) 1904, system memory 1912 coupled to system control module 1908, non-volatile memory (NVM)/storage 1916 coupled to system control module 1908, and one or more communications interface(s) 1920 coupled to system control module 1908.

In some embodiments, the system 1900 may be capable of functioning as the UE 15 as described herein. In some embodiments, a system control module 1908 of the UE 15 may include a NAS module and an AS module as described herein. In other embodiments, the system 1900 may be capable of functioning as the one or more servers 50 of FIG. 1 or otherwise provide logic/module that performs functions as described for a base station 40, one or more nodes, SCS 52, MTC-IWF 54, HLR/HSS 56, SGSN/MME 58, RAN 20, PGW 42, and other modules described herein. In some embodiments, the system 1900 may include one or more computer-readable media (e.g., system memory or NVM/storage 1916) having instructions and one or more processors (e.g., processor(s) 1904) coupled with the one or more computer-readable media and configured to execute the instructions to implement a module to perform actions described herein.

System control module 1908 for one embodiment may include any suitable interface controllers to provide for any suitable interface to at least one of the processor(s) 1904 and/or to any suitable device or component in communication with system control module 1908.

System control module 1908 may include memory controller module 1910 to provide an interface to system memory 1912. The memory controller module 1910 may be a hardware module, a software module, and/or a firmware module.

System memory 1912 may be used to load and store data and/or instructions, for example, for system 1900. System memory 1912 for one embodiment may include any suitable volatile memory, such as suitable DRAM, for example. In some embodiments, the system memory 1912 may include double data rate type four synchronous dynamic random-access memory (DDR4 SDRAM).

System control module 1908 for one embodiment may include one or more input/output (I/O) controller(s) to provide an interface to NVM/storage 1916 and communications interface(s) 1920.

The NVM/storage 1916 may be used to store data and/or instructions, for example. NVM/storage 1916 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 1916 may include a storage resource physically part of a device on which the system 1900 is installed or it may be accessible by, but not necessarily a part of, the device. For example, the NVM/storage 1916 may be accessed over a network via the communications interface(s) 1920.

Communications interface(s) 1920 may provide an interface for system 1900 to communicate over one or more network(s) and/or with any other suitable device. The system 1900 may wirelessly communicate with the one or more components of the wireless network in accordance with any of one or more wireless network standards and/or protocols.

For one embodiment, at least one of the processor(s) 1904 may be packaged together with logic for one or more controller(s) of system control module 1908, e.g., memory controller module 1910. For one embodiment, at least one of the processor(s) 1904 may be packaged together with logic for one or more controllers of system control module 1908 to form a System in Package (SiP). For one embodiment, at least one of the processor(s) 1904 may be integrated on the same die with logic for one or more controller(s) of system control module 1908. For one embodiment, at least one of the processor(s) 1904 may be integrated on the same die with logic for one or more controller(s) of system control module 1908 to form a System on Chip (SoC).

In various embodiments, the system 1900 may be, but is not limited to, a server, a workstation, a desktop computing device, or a mobile computing device (e.g., a laptop computing device, a handheld computing device, a tablet, a netbook, etc.). In various embodiments, the system 1900 may have more or less components, and/or different architectures. For example, in some embodiments, the system 1900 includes one or more of a camera, a keyboard, liquid crystal display (LCD) screen (including touch screen displays), non-volatile memory port, multiple antennas, graphics chip, application-specific integrated circuit (ASIC), and speakers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
non-access stratum (NAS) circuitry coupled with access stratum (AS) circuitry, the NAS circuitry to:
receive a trigger to send a data payload to a wireless communication network, the data payload having a size that is less than a preconfigured threshold;
generate a NAS message including the data payload; and
transmit, using the AS circuitry, the NAS message including the data payload to a node comprising a Mobility Management Entity (MME) or a Serving General Packet Radio Service Support Node (SGSN) upon establishment of a Radio Resource Control (RRC) connection,
wherein the NAS message is an attach request message for initiation of an attachment procedure with the node and the attach request message includes a communication type information element, and the communication type information element is an attach type information element that includes three bits to indicate an attach type value, wherein the attach type value is to indicate that a purpose of the attachment procedure with the node is for small data transmission.

2. The apparatus of claim 1, wherein the NAS message includes a small data container information element, the small data container information element including the data payload.

3. The apparatus of claim 2, wherein the small data container information element is included with the NAS message based on a determination that the communication type information element indicates that the apparatus is communicating with the wireless communication network to transmit the data payload.

4. The apparatus of claim 2, wherein the small data container information element includes information to identify the small data container information element and information to indicate a size of the data payload.

5. The apparatus of claim 1, wherein:
the attach type value indicates that the apparatus is communicating with the wireless communication network to transmit the small data payload if a first bit of the three bits has a value of 0, a second bit of the three bits has a value of 0, and a third bit of the three bits has a value of 1.

6. A method comprising:
receiving, by a node including a Mobility Management Entity (MME) or a Serving General Packet Radio Service Support Node (SGSN), a request to send a data payload to user equipment (UE) of a wireless communication network over a radio access network (RAN);
sending, by the node to the UE via the RAN, a paging message including a small data indicator information element that indicates that a data payload intended for transmission to the UE is located at the node, and wherein the data payload is smaller than a preconfigured threshold;
subsequent to sending the paging message, sending, by the node to the UE via the RAN, a non-access stratum (NAS) message that includes the data payload; and
receiving, by the node from the UE, an extended service request message to request a NAS attachment with the node and to indicate whether the UE has a small data payload to send to the wireless communication network, wherein:
the extended service request message is sent by the UE in response to the paging message and upon establishment of a Radio Resource Control (RRC) connection between the UE and the RAN;
the extended service request message includes a service type information element having a service type value that is to indicate that a purpose of the NAS attachment with the node is for small data transmission and whether the UE has a small data payload to send to the wireless communication network; and
the service type information element includes four bits to indicate the service type value.

7. The method of claim 6, wherein the NAS message is a NAS transport message that includes a NAS message container information element, the NAS message container information element including the data payload.

8. The method of claim 6, wherein:
the service type value indicates that the UE has no small data payload to send to the wireless communication network if a first bit of the four bits has a value of 0, a second bit of the four bits has a value of 0, a third bit of the four bits has a value of 1, and a fourth bit of the four bits has a value of 1; and
the service type value indicates that the UE has a small data payload to send to the wireless communication network in a small data container information element included with the service request message if the first bit has a value of 1, the second bit has a value of 0, the third bit has a value of 1, and the fourth bit has a value of 1.

9. A base station, comprising:
one or more non-transitory computer-readable media having instructions; and
one or more processors coupled with the one or more computer-readable media to execute the instructions to:
receive, from a node of a wireless communication network including a Mobility Management Entity (MME) or a Serving General Packet Radio Service Support Node (SGSN), a first paging message including a small data indicator information element that indicates transmission of a data payload from the node to a user equipment (UE) of the wireless communication network, wherein the data payload is a small data payload that is smaller than a preconfigured threshold; and
send a second paging message including the small data indicator information element to the UE, wherein:
the first paging message received by the base station includes the small data payload;
the second paging message sent by the base station does not include the small data payload;
the small data indicator information element in the second paging message indicates that the small data payload is intended for transmission to the UE and is located at the base station; and
the one or more processors are further to execute the instructions to
receive a radio resource control (RRC) connection request message from the UE, the RRC connection request message being sent by the UE in response to the paging message, and
receive, from the UE in response to the RRC connection request message, an RRC connection setup complete message and an extended service request message to request a NAS attachment with the node, wherein the extended service request message includes a service type information element having a service type value, and wherein the service type value indicates that a purpose of the NAS attachment with the node is for small data transmission and indicates whether the UE has a small data payload to send to the wireless communication network.

10. The base station of claim 9, wherein the one or more processors are further to execute the instructions to send an RRC connection setup message including the small data payload to the UE in response to the RRC connection request message.

11. An apparatus comprising:
non-access stratum (NAS) circuitry coupled with access stratum (AS) circuitry, the NAS circuitry to:
receive a trigger to send a data payload to a wireless communication network, the data payload having a size that is less than a preconfigured threshold;
generate a NAS message including the data payload; and
transmit, using the AS circuitry, the NAS message including the data payload to a node comprising a Mobility Management Entity (MME) or a Serving General Packet Radio Service Support Node (SGSN) upon establishment of a Radio Resource Control (RRC) connection,
wherein the NAS message is a routing area update request message for initiation of a routing area update procedure with the node and the routing area update request message includes a communication type information element, and the communication type information element is an update type information element that includes three bits to indicate an update type value, wherein the update type value is to indicate that a purpose of the routing area update procedure with the node is for periodic updating with small data transmission or for routing area updating with small data transmission.

12. The apparatus of claim 11, wherein:

the update type value indicates that the apparatus is communicating with the wireless communication network to transmit the small data payload as part of a periodic updating if a first bit of the three bits has a value of 0, a second bit of the three bits has a value of 0, and a third bit of the three bits has a value of 1; and the update type value indicates that the apparatus is communicating with the wireless communication network to transmit the small data payload as part of routing area updating if a first bit of the three bits has a value of 1, a second bit of the three bits has a value of 0, and a third bit of the three bits has a value of 1.

13. An apparatus comprising:

non-access stratum (NAS) circuitry coupled with access stratum (AS) circuitry, the NAS circuitry to:

receive a trigger to send a data payload to a wireless communication network, the data payload having a size that is less than a preconfigured threshold;

generate a NAS message including the data payload; and transmit the NAS message including the data payload to a node comprising a Mobility Management Entity (MME) or a Serving General Packet Radio Service Support Node (SGSN) upon establishment of a Radio Resource Control (RRC) connection, wherein the NAS message is a tracking area update request message for initiation of a tracking area update procedure with the node and the tracking area update request message includes a communication type information element, and the communication type information element is an update type information element that includes three bits to indicate an update type value, wherein the update type value is to indicate that a purpose of the tracking area update procedure with the node is for periodic updating with small data transmission or for tracking area updating with small data transmission.

14. The apparatus of claim 13, wherein:

the update type value indicates that the apparatus is communicating with the wireless communication network to transmit the small data payload as part of tracking area updating if a first bit of the three bits has a value of 0, a second bit of the three bits has a value of 0, and a third bit of the three bits has a value of 1; and the update type value indicates that the apparatus is communicating with the wireless communication network to transmit the small data payload as part of a periodic updating if a first bit of the three bits has a value of 1, a second bit of the three bits has a value of 0, and a third bit of the three bits has a value of 1.

* * * * *